(12) United States Patent
Katz et al.

(10) Patent No.: US 6,380,266 B1
(45) Date of Patent: Apr. 30, 2002

(54) AMORPHOUS SILICA HAVING DISCRETE VOIDS AND SPATIALLY ORGANIZED FUNCTIONALITIES FORMED THEREIN

(75) Inventors: Alexander Katz, Flagstaff, AZ (US); Mark E. Davis, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/096,991

(22) Filed: Jun. 12, 1998

Related U.S. Application Data

(60) Provisional application No. 60/049,615, filed on Jun. 13, 1997.

(51) Int. Cl.[7] .......................... B01J 13/00; B01J 21/08; B01J 23/755; B01J 31/00; B01D 21/01
(52) U.S. Cl. ................... 516/101; 427/219; 427/220; 428/405; 501/12; 502/158; 516/100
(58) Field of Search .................. 427/219, 220; 428/405; 501/12; 502/158; 516/100, 101

(56) References Cited

U.S. PATENT DOCUMENTS

| | | | |
|---|---|---|---|
| 3,980,583 A | 9/1976 | Mitchell et al. | |
| 4,782,040 A | 11/1988 | Revis et al. | 502/401 |
| 4,950,634 A | 8/1990 | Williams et al. | 502/401 |
| 5,047,380 A | 9/1991 | Tour et al. | 502/158 |
| 5,110,784 A | 5/1992 | Williams et al. | 502/401 |
| 5,286,571 A | 2/1994 | Mirkin et al. | 428/428 |
| 5,321,102 A | 6/1994 | Loy et al. | 525/474 |
| 5,620,938 A | 4/1997 | Sielcken | 502/152 |
| 5,708,101 A | 1/1998 | Bercaw et al. | 526/127 |

FOREIGN PATENT DOCUMENTS

JP 58-83638 A 5/1983

OTHER PUBLICATIONS

Olah, et al., "Iodotrimethylsilane—A Versatile Synthetic Reagent", *Tetrahedron*, 38 (15), pp. 2225–2277 (1982).
Loy, et al., "Bridged Polysilsesquioxanes. Highly Porous Hybrid Organic–Inorganic Materials", *Chem. Rev.* 95 (5), pp. 1431–1442 (1995).
Tao, et al., "Molecular Recognition in a Monolayer Matrix on Silica Gel", *J. Chem. Soc., Chem. Commun.*, pp. 417–418 (1988).
Glad, et al., "Use of Silane Monomers for Molecular Imprinting and Enzyme Entrapment in Polysiloxane–Coated Porous Silica", *J. of Chromatography* 347, pp. 11–23 (1985).
Khatib, et al., "Insoluble Ligands and Their Applications. I. A Comparison of Silica–Immobilized Ligands and Functionalized Polysiloxanes", *J. Org. Chem.* 369, pp. 9–16 (1989).
El–Nahhal, et al., "Insoluble Ligands and Their Applications. III. Polysiloxane Diaminoethane Derivatives", *J. Org. Chem.* 452, pp. 19–22 (1993).
El–Nahhal, et al., "Synthesis and Solid–State NMR Structural Characterization of Polysiloxane–Immobilized Thiol and Thiol–Amine Ligands", *J. Non–Crystalline Solids* 208, pp. 105–118 (1996).
Wulff, et al., "Molecular Recognition Through the Exact Placement of Functional Groups on Rigid Matrices via a Template Approach", *J. Am. Chem. Soc.* 108 (5), pp. 1089–1091 (1986).
Wulff, et al., "Enzyme–Analogue Built Polymers, 24. On the Distance Accuracy of Functional Groups in Polymers and Silicas Introduced by a Template Approach", *Reactive Polymers* 6, pp. 299–310 (1987).
Hwang, et al., "Template–Assisted Assembly of Metal Binding Sites on a Silica Surface", *Materials Science and Engineering: C* 3, pp. 137–141 (1995).
Tahmassebi, et al., "Synthesis of a New Trialdehyde Template for Molecular Imprinting", *J. Org. Chem.* 59 (3), pp. 679–681 (1994).
Kempe, et al., "Molecular Imprinting Used for Chiral Separations", *Journal of Chromatography A* 694, pp. 3–13 (1995).
Davis, et al., "Rational Catalyst Design via Imprinted Nanostructured Materials", *Chem. Mater.* 8 (8), pp. 1820–1839 (1996).

*Primary Examiner*—Richard D. Lovering
(74) *Attorney, Agent, or Firm*—Pillsbury Winthrop LLP

(57) ABSTRACT

The present invention relates to amorphous inorganic materials having pores of controlled size and shape with one or more spatially organized functional groups formed therein. Much like the active site residues in an enzyme, these functional groups can be positioned in a defined three dimensional relationship within the voids and with respect to each other. By varying both the positions and identities of these functional groups, diverse sets of substrate specific adsorbents and non-biologically-based catalysts can be made.

40 Claims, 14 Drawing Sheets

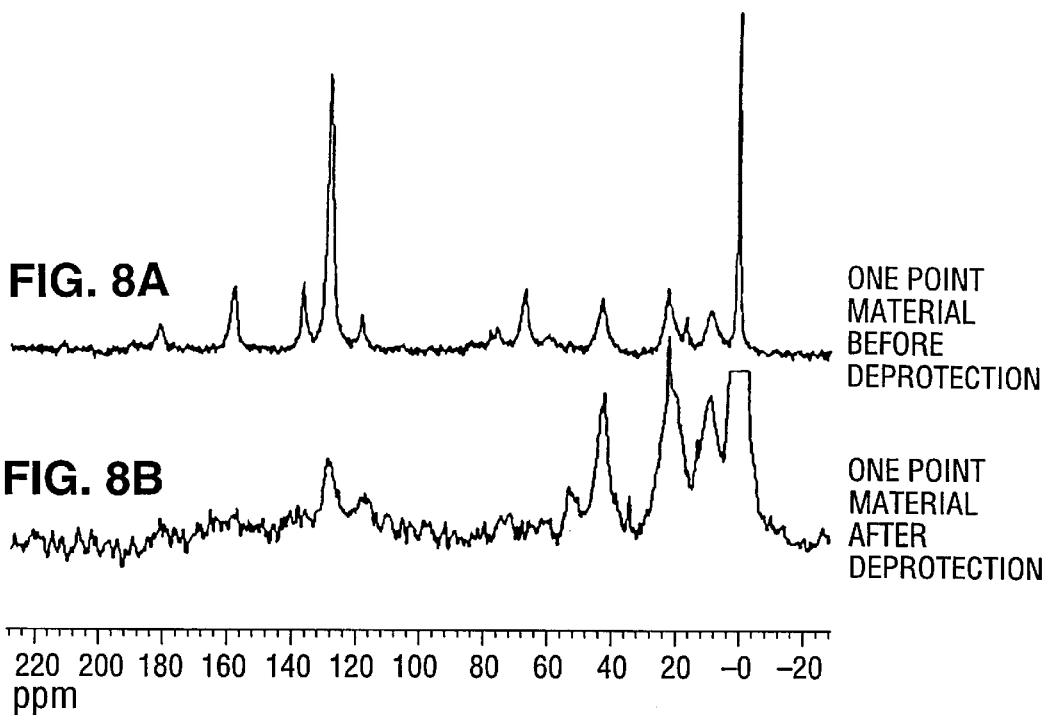
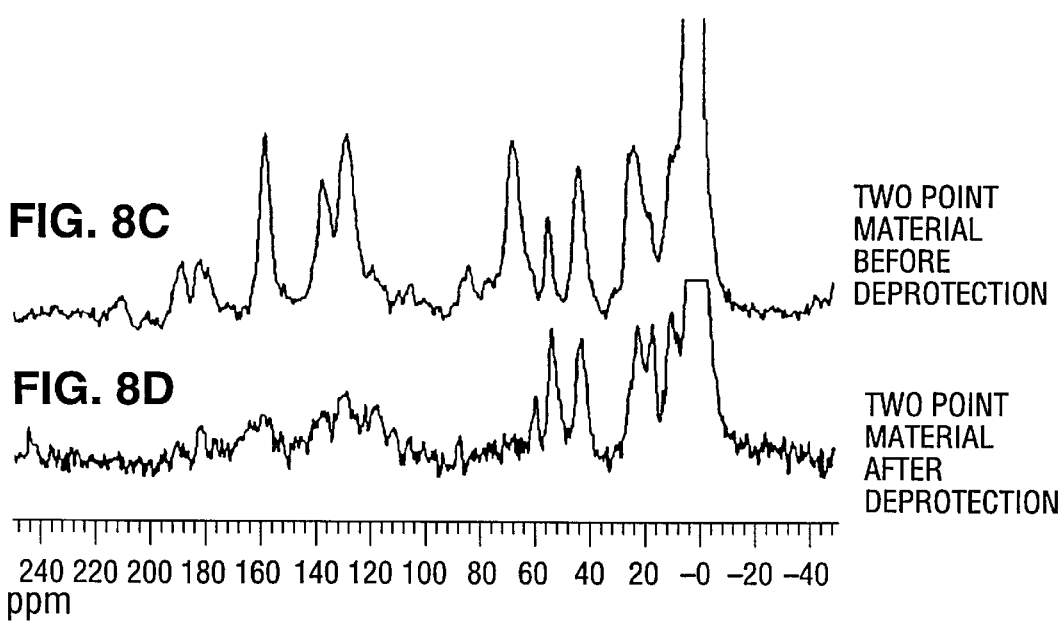

US 6,380,266 B1

AMORPHOUS SILICA HAVING DISCRETE VOIDS AND SPATIALLY ORGANIZED FUNCTIONALITIES FORMED THEREIN

This application claims the benefit of U.S. Provisional Application No. 60/049,615, filed Jun. 13, 1997 by inventors Alexander Katz and Mark E. Davis entitled "AMORPHOUS, MICROPOROUS SILICAS POSSESSING SPATIALLY ORGANIZED ORGANIC FUNCTIONALITIES" which is incorporated herein by reference.

BACKGROUND

The present invention generally relates to functionalized imprinted materials. More particularly, the present invention relates to amorphous silicas having discrete pores of controlled size and shape with one or more spatially organized functional groups formed therein.

As paragons of substrate specificity and catalytic efficiency, enzymes have been the inspiration behind the design of novel catalytic systems as well as the benchmark against which these systems are judged. In the biological context, novel catalysts generally take two forms. The first category relates to enzyme mutants in which the amino acid sequence of a naturally occurring enzyme has been altered at one or more residue sites to modulate substrate binding, substrate turnover, enzyme stability, or to introduce new functionalities. The second category relates to catalytic antibodies which take advantage of an immune system's inherent ability to produce antibodies that specifically bind to an antigen. Catalytic ability is introduced into this system by challenging the immune system with an antigen that is also an analog for the transition state of the desired reaction.

Although the procedures for producing the desired mutant enzymes or catalytic antibodies are not always straightforward, they have been generally successful in producing novel enzymes and enzyme-like mimics. However, because of the low substrate concentrations involved (typically micromolar or smaller), the high costs associated with water removal and reactor size make these approaches impractical for many industrial applications.

In contrast, non-biologically based catalysts tend to be much more commercially viable. For example, zeolites are a prototypical example and are generally cost-effective and are robust to a variety of harsh conditions that would denature most proteins. Unfortunately, zeolites, like most inorganic systems, are useful as catalysts for only a limited number of reactions. Because the narrow catalytic range is the main disadvantage to these systems, novel strategies are required for developing more versatile, non-protein based catalysts.

SUMMARY OF THE INVENTION

The present invention applies the principles of enzyme specificity and catalysis in a non-biological context. In the most general terms, the present invention relates to amorphous inorganic materials having discrete voids of controlled sized and shape that are akin to enzymatic active sites. The size and shape of the voids are readily varied and are typically complementary to the desired substrate (or the reaction's transition state). One or more spatially organized functional groups are positioned in a defined three dimensional relationship within each void and with respect to each other such that the imprinted material contains a plurality of substantially similar functionalized void spaces. By varying both the positions and identities of the one or more functional groups, diverse sets of substrate specific adsorbents and non-biologically-based catalysts are created.

BRIEF DESCRIPTION OF THE DRAWINGS

FIG. 8 is a $^{13}$C CP/MAS NMR for a) one-point material before deprotection, b) one-point material after deprotection, c) two-point material before deprotection, d) two-point material after deprotection.

DESCRIPTION OF THE PREFERRED EMBODIMENTS

Figure 1A:
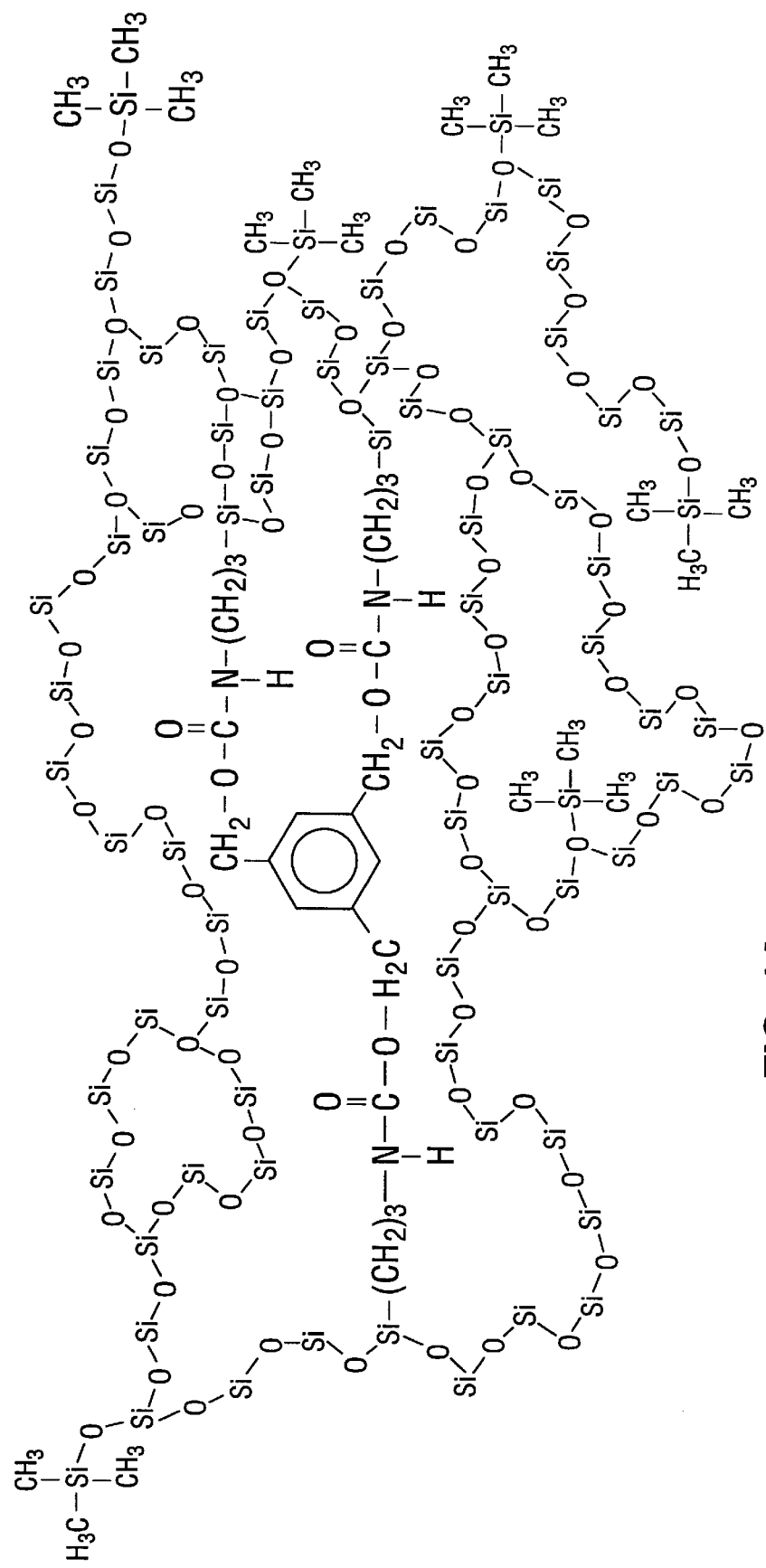
FIG. 1A is a schematic of a would-be imprinted site (resulting from the three point imprint compound) within the imprinted silica.

The present invention relates to amorphous materials having discrete voids of controlled size and shape with one or more spatially organized functional groups formed therein. As used herein, the term "amorphous" refers to a material that is x-ray indifferent. In other words, the material lacks long range order such that it results in a featureless x-ray diffraction pattern. Because MCM-41S materials possess x-ray diffraction patterns which include at least one broad peak at high d-spacings (above 10 Å), they are not encompassed by the term "amorphous" as used herein. The term "discrete" means that the functionalized void spaces are locally surrounded by the amorphous material. In other words, the voids are spaced apart within the amorphous material such that binding of substrate molecules to these voids results in a substantial portion of the bound molecules to be separated from one another. In preferred embodiments, the voids are homogenously distributed (or substantially evenly dispersed) within the amorphous material.

The voids in the inventive materials are three dimensional spaces or cavities and may be of any suitable size. For example, depending on the particular application, the voids may be microporous (less than 20 Å as defined by IUPAC) or may be mesoporous (between about 20 Å and about 1000 Å, more typically between about 50 Å and about 400 Å). Much like the active site residues in an enzyme, one or more functional groups are positioned in a defined three dimensional relationship within the void spaces and with respect to each other. Varying the positions and identities of these functional groups results in a diverse set of substrate specific adsorbents and non-protein based catalysts.

The inventive methods for creating voids having "active-site-like" properties (substrate specificity and catalysis) may be practiced with any material that is capable of being organized around one or more imprint molecules (in other words, "an imprintable material"). Suitable examples include inorganic oxides such as those formed from silicon and germanium.

The most preferred inorganic material for the practice of the present invention is amorphous silica. In addition to rigidity (more than 300 times more rigid as measured by Young's modulus than ethylene glycol dimethacrylate), amorphous silica is more robust than organic polymers and is capable of withstanding harsh conditions such as high temperatures and various organic solvents. Because of this strong preference, the present invention will hereinafter be illustrated with amorphous silica (also referred to as silica gel) when context requires an explicit reference to the imprintable material.

In one embodiment of the present invention, an imprinted material is formed using a unique set of imprint molecules that allows for the formation of voids of controlled size and shape. In the most general terms, the imprint compound is of the formula $$Z—(W^n)_n$$

wherein
Z is the organizing moiety,
$W^1$ to $W^n$ (i.e., $W^1$, $W^2$ ... $W^{n-1}$, $W^n$) are independently each an attachment moiety; and,
n is any positive integer.

The organizing moiety, Z, is the primary determinant of the size and shape of the resulting void and is generally complementary in size and shape to the desired substrate (or the reaction's transition state). Illustrative examples of suitable organizing moieties include but are not limited to $C_3$–$C_{20}$ branched alkyl, $C_2$–$C_{20}$ alkenyl, cycloalkyl, cycloalkenyl, aryl, and heteroaryl. Preferred embodiments of Z include isopropyl, isobutyl, tert-butyl, neopentyl, butenyl, isobutenyl, cyclopentane, cyclopentene, cyclopentadiene, cyclohexane, cyclohexene, and cyclohexadiene. In especially preferred embodiments, Z is aryl or heteroaryl such as anthracyl, adamantyl, furyl, imidazolyl, isoquinolyl, phenyl, naphthyl, anthracyl, phenantracyl, pyridyl, pyrimidyl, pyrryl, and quinolyl. Z may optionally include one or more substituents selected from the group consisting of $C_1$–$C_{10}$ alkyl, $C_2$–$C_{10}$ alkenyl, aryl, and heteroaryl.

The inventive imprint compounds further include at least one tether moiety W for attaching Z to the polymer being imprinted. In the most basic embodiment, attachment moiety W is a group that is capable of being crosslinked to the polymer being imprinted. Suitable Ws include compounds of the formula

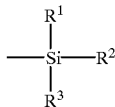

wherein $R^1$, $R^2$, and $R^3$ are each independently either a hydrolyzable group or a moiety selected from the group consisting of $C_1$–$C_{20}$ alkyl, $C_2$–$C_{20}$ alkenyl, $C_2$–$C_{20}$ alkynyl, cycloalkyl, cycloalkenyl, cycloalkadienyl, aryl, and heteroaryl, each optionally substituted with one or more substituents selected from the group consisting of $C_1$–$C_5$ alkyl, $C_2$–$C_5$ alkenyl, $C_2$–$C_5$ alkynyl, allyl, aryl, and heteroaryl, provided that at least one of $R^1$, $R^2$, and $R^3$ is a hydrolyzable group. The one or more hydrolyzable groups allow the imprint compound to be crosslinked to the polymer being imprinted.

In preferred embodiments, $R^1$, $R^2$, and $R^3$ are identical to each other and selected from the group consisting of hydrogen, hydroxy, $C_1$–$C_{10}$ alkyloxy, aryloxy, and halide. In especially preferred embodiments, $R^1$, $R^2$, and $R^3$ are identical to each other and selected from the group consisting of methoxy, ethoxy, propoxy, butoxy and chloride.

Optionally, W may include a linker group that separates Z from the point of attachment to the polymer framework. The linker essentially acts as a shim at specific sites to further modulate the size and shape of the resulting void. Suitable Ws for this purpose include compounds of the formula

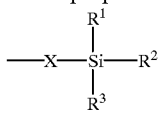

wherein $R^1$, $R^2$, and $R^3$ are as previously defined and X is a linker group. Suitable examples of X include $C_1$–$C_{20}$ alkyl, $C_2$–$C_{20}$ alkenyl, $C_2$–$C_{20}$ alkynyl, cycloalkyl, cycloalkenyl, cycloalkadienyl, aryl, and heteroaryl. In preferred embodiments, X is selected from the group consisting of $C_1$–$C_{10}$ alkyl, $C_2$–$C_{10}$ alkenyl, $C_2$–$C_{10}$ alkynyl, $C_5$–$C_6$ cycloalkyl, $C_5$–$C_6$ cycloalkenyl, phenyl, naphthyl, and anthracyl. The most preferred X is —$(CH_2)_m$— wherein m is from 1 to 6.

In addition to a linker group, W may further include a latent functional group Y. The functional group is "latent" because the functional group remains hidden (or protected) until the components which comprise Y are decoupled (or deprotected), preferably during the removal of Z from the imprinted material. An overview of protection and deprotection strategies may be found in "Protective Groups in Organic Chemistry" by Theodora W. Greene, and Peter G. M. Wuts (John Wiley & Sons, 2nd Ed., 1991). Under this scenario, suitable Ws include compounds of the formula

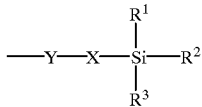

wherein $R^1$, $R^2$, $R^3$, and X are as previously defined and Y is a latent functional group. Suitable examples of Y include but are not limited to amide, carbamate, carbonate, ether, ester, imine, acetal, ketal, boronate, cyanohydrin, hydrazone, oxime, oxazole, oxazoline, oxalane, hydrazide, enamine, sulfone, sulfide, and sulfenyl. For example, when Y is a carbamate, hydrolysis would result either in a carboxylic acid or an amine functional group (depending on the orientation of the group with respect to Z) tethered by linker X to the point of imprint attachment within the pore. As it can be seen, the placement of each functional group within the pore is primarily determined by its position with respect to Z and the identity and position of X.

Referring back to the more general formula for the imprint compound

Z may include any number of attachment moieties. In preferred embodiments, n is from 1 to 10. In more preferred embodiments, n is from 1 to 5. In the most preferred embodiments, n is equal to or less than 3. Because the Ws may be independent of each other, when n is a plurality, W may be selected from any combination of

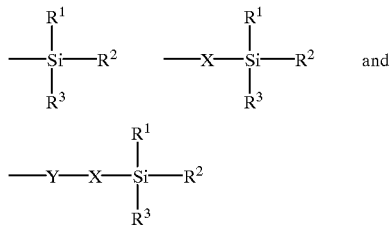

wherein $R^1$, $R^2$, $R^3$, X, and Y are as previously defined. Optionally, the imprint compound, $Z\text{---}(W_n)_n$, may also be functionalized with one or more of the following illustrative groups: alcohol, sulfonic acid, phosphine, phosphonate, phosphonic acid, thiol, ketone, aldehyde, ester, ether, amine, quaternary ammonium, imine, amide, imide, imido, nitro, carboxylic acid, disulfide, carbonate, isocyanate, carbodiimide, carboalkoxy, carbamate, acetal, ketal, boronate, cyanohydrin, hydrazone, oxime, oxazole, oxazoline, oxalane, hydrazide, enamine, sulfone, sulfide, sulfenyl, and halogen.

In preferred embodiments, the imprint compound has the general formula

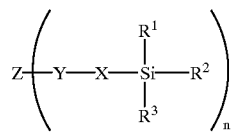

wherein $R^1$, $R^2$, $R^3$, X, Y, and Z are as previously defined and n is from 1 to 5. In even more preferred embodiments, $R^1$, $R^2$, and $R^3$, are the same and are $C_1$–$C_{10}$ alkoxy or halide; X is $C_1$–$C_{10}$ alkyl, $C_2$–$C_{10}$ alkenyl, $C_2$–$C_{10}$ alkynyl, $C_5$–$C_6$ cycloalkyl, $C_5$–$C_6$ cycloalkenyl, phenyl, naphtyl, and anthracyl; Y is carbamate; and Z is phenyl optionally substituted with one or more $C_1$–$C_5$ alkyl groups. In the most preferred embodiments, $R^1$, $R^2$, and $R^3$, are the same and are ethoxy; X is $\text{---}(CH_2)_m$ wherein m is from 1 to 6; Y is carbamate; and Z is phenyl optionally substituted with one or more $C_1$–$C_5$ alkyl groups.

Especially preferred examples of

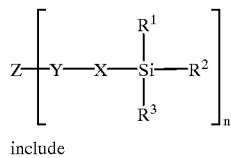

include

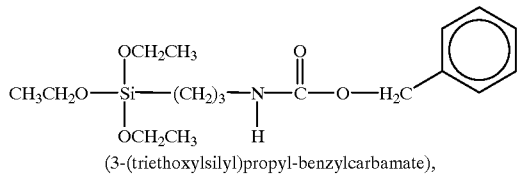

(3-(triethoxylsilyl)propyl-benzylcarbamate),

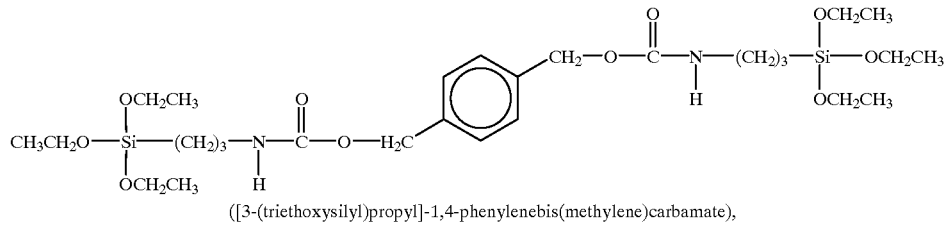

([3-(triethoxysilyl)propyl]-1,4-phenylenebis(methylene)carbamate), and

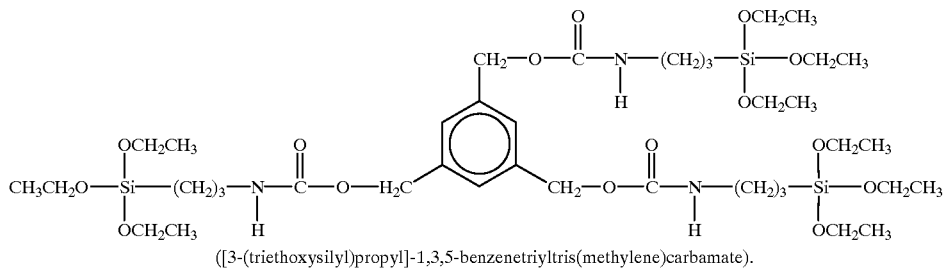

([3-(triethoxysilyl)propyl]-1,3,5-benzenetriyltris(methylene)carbamate).

Based on the value of n, the above compounds will be hereinafter referred to as the one point imprint, two point imprint, and three point imprint respectively.

Imprinted silica material is formed by condensing the imprint compound (i.e., one, two, or three point imprint) with a source of silica. The reaction conditions are preferably acidic to minimize the differences in the hydrolysis rates between organosilanes and silanes for a more homogenous incorporation of the imprint compound within the silica gel framework.

The source of silica may be silica itself or any silica precursor such as silicates, silica hydrogel, silicic acid, colloidal silica, fumed silicas, tetraalkyl orthosilicates, and silica hydroxides. In general, silica precursors having groups with similar hydrolysis rates as those contained in the imprint compound are preferred. For example, since the one, two, and three point imprints contain ethoxy groups attached to the silicon atom, the silica precursor preferably also includes one or more ethoxy groups. Accordingly, one example of a particularly preferred silica precursor for use with the one, two, and three point imprints is tetraethylorthosilicate ("TEOS"):

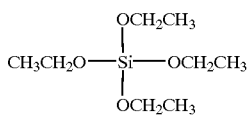

The product of the condensation reaction between the source of silica and the imprint compound is a material in which the imprint compound has been covalently incorporated therein and crosslinked therewith. This silica gel product is sometimes referred to as the "as-made material" and requires further processing before use. Briefly, the as-made material is extracted to remove residual moisture ("extracted material") and capped to remove any free hydroxyl functionalities ("capped material") using standard methods. The imprint compound is then removed from the silica gel using any suitable method ("imprinted amorphous silica"; imprinted silica gel"; or "final product"). For example, depending on the nature of the imprint compound, $Z$—$(W'')_n$, the imprint compound may be selectively cleaved at one or more specific cleavage sites built into the one or more Ws.

Practice of the invention yields amorphous silica having discrete voids that are approximately complementary in size and shape to the organizing moiety Z with one or more spatially organized organic moieties contained therein. In preferred embodiments, the voids are of substantially similar size and shape. The organic moieties are organized within the voids as a result of being part of a imprint compound (which includes the organizing moiety Z) that is crosslinked to the silica framework. When Z is removed, the one or more portions of the imprint compound that remains crosslinked to the framework are of the general formula

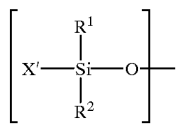

wherein:

X' is a substituted or unsubstituted moiety, and $R^1$ and $R^2$ are independently each oxygen, or substituted or unsubstituted moiety, the moiety being selected from the group consisting $C_1$–$C_{20}$ alkyl, $C_2$–$C_{20}$ alkenyl, $C_2$–$C_{20}$ alkynyl, cycloalkyl, cycloalkenyl, cycloalkadienyl, aryl, and heteroaryl, each optionally substituted with one or more groups selected from the group consisting of $C_1$–$C_5$ alkyl, $C_2$–$C_5$ alkenyl, $C_2$–$C_5$ alkynyl, allyl, aryl, heteroaryl, and a functional group selected from the group consisting of alcohol, sulfonic acid, phosphine, phosphonate, phosphonic acid, thiol, ketone, aldehyde, ester, ether, amine, quaternary ammonium, imine, amide, imide, imido, nitro, carboxylic acid, disulfide, carbonate, isocyanate, carbodiimide, carboalkoxy, carbamate, acetal, ketal, boronate, cyanohydrin, hydrazone, oxime, oxazole, oxazoline, oxalane, hydrazide, enamine, sulfone, sulfide, sulfenyl, halide and metal. Additional points of attachment to the silica framework are created when either $R^1$ and $R^2$ is also oxygen.

In more preferred embodiments, $R^1$ and $R^2$ are each oxygen and the moiety is selected from the group consisting of $C_1$–$C_{10}$ alkylamine, $C_2$–$C_{10}$ alkenylamine, $C_2$–C alkynylamine, cycloalkylamine, and arylamine. In even more preferred embodiments, X' is

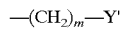

wherein m is from 1 to 6 and Y' is a functional group selected from the group consisting of alcohol, thiol, amine, nitro, carboxylic acid, and halide.

Optionally, the organic moieties incorporated into the pores may be further reacted to either modify existing functionalities or to add new functionalities. For example, the amine group in the most preferred embodiments may be reacted to form a variety of other organic groups (i.e. alkylation, conversion into amides). Because the molecular framework of the amorphous silica is generally robust to a variety of synthetic conditions, standard organic chemistry protocols may be used in most cases. Illustrative examples of such protocols may be found, for example, in "Advanced Organic Chemistry," Third Edition (1985) by Jerry March which is incorporated herein by reference.

Further functionalization may also include the formation of a coordination complex between at least one of the incorporated organic moieties and a metal or metal-containing ion. In the simplest case, a functional group such as amines, thiols and carboxylic acid can interact with one or more metal-containing ions to form active metal centers. For example, the one or more organized amines within the inventive amorphous silica may be further functionalized by contacting the amine functionalized silica with a source of a metal-containing ion such as $Al^{3+}$, $Ag^+$, $Co^{3+}$, $Cu^{2+}$, $Fe^{3+}$, $Hg^{3+}$, $Mn^{3+}$, $Ni^{3+}$, $UO_2^{2+}$, and $Zn^{3+}$. The resulting metal functionalized silica may then be used for a variety of metal-mediated reactions such as oxidation and reduction. In particular, because of their ability to directly bind oxygen, $Cu^{2+}$ and $Fe^{3+}$ may be used to activate oxygen in a number of oxidative reactions. In addition to the variety of organic moieties, X', $R^1$, and $R^2$ (either individually or in combination) may act as a ligand to form an organometallic complex with a transition metal. As used herein, a transition metal is any one of the following elements: scandium, yttrium, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, copper, silver, and gold. Illustrative examples of suitable ligands from which any combination of X', $R^1$, and $R^2$ may be selected include but are not limited to alkyl, aryl, vinyl, allyl, aminoborole, cyclopentadienyl, pentacyclopentadienyl, cyclohexadienyl, phosphine, amine, nitrile, isonitrile, diene, arene, carbonyl, carbene, alkene, alkyne, cyclobutadiene, cycloheptadiene, alkylidene, halide, and combinations thereof. An overview of transition metals in organic chemistry may be found in "Transition Metals in the Synthesis of Complex Organic Molecules" by Louis S. Hegedus published by University Science Books (1994). Alternatively, X', $R^1$, and $R^2$ may together (e.g. X' and $R^1$; X' and $R^2$; $R^1$ and $R^2$; or X', $R^1$, and $R^2$) form a moiety such as various porphyrins (for binding transition metals like iron and copper).

The coordination of a transition metal by one or more organic moieties broadens the scope of the reactions that are otherwise possible. For example, any combination of X', $R^1$, and $R^2$ may together form a metallocene (e.g. with any one of iron, cobalt, hafnium, nickel, scandium, titanium, yttrium, and zirconium). Illustrative examples of suitable metallocenes that may be formed are found in U.S. Pat. No. 5,708,101 entitled "Stereospecific Olefin Polymerization Catalysts" to inventors John E. Bercaw and Timothy Herzog which is incorporated herein by reference. In addition to olefin polymerization, metallocenes can participate in a wide variety of aromatic ring substitution reactions including Friedel-Crafts acylation, arylation, and sulfonation.

which states that chiral recognition requires a minimum of three simultaneous interactions between the binding site and at least one of the enantiomers, with at least one of these interactions being stereochemically dependent. The third interaction should not be co-linear with the other two interactions. In other words, the at least three interactions should define a plane covering the stereogenic center. Thus, by varying the identities and positions of the moieties that remain crosslinked to the framework when Z is removed, a suitable functionalized silica may be designed using these principles to discriminate between particular sets of enantiomers. Although this ability has numerous applications, an especially noteworthy one is in the pharmaceutical industry. Due in part to the difficulties in enantiomeric separation, approximately 90% of the current asymmetric drugs in the market are administered as racemates.

As it may be appreciated, there is tremendous flexibility as to the identities of X', $R^1$, and $R^2$. However, for the purposes of clarity, the specifics of the present invention will be henceforth illustrated with reference to the functionalized silica made from

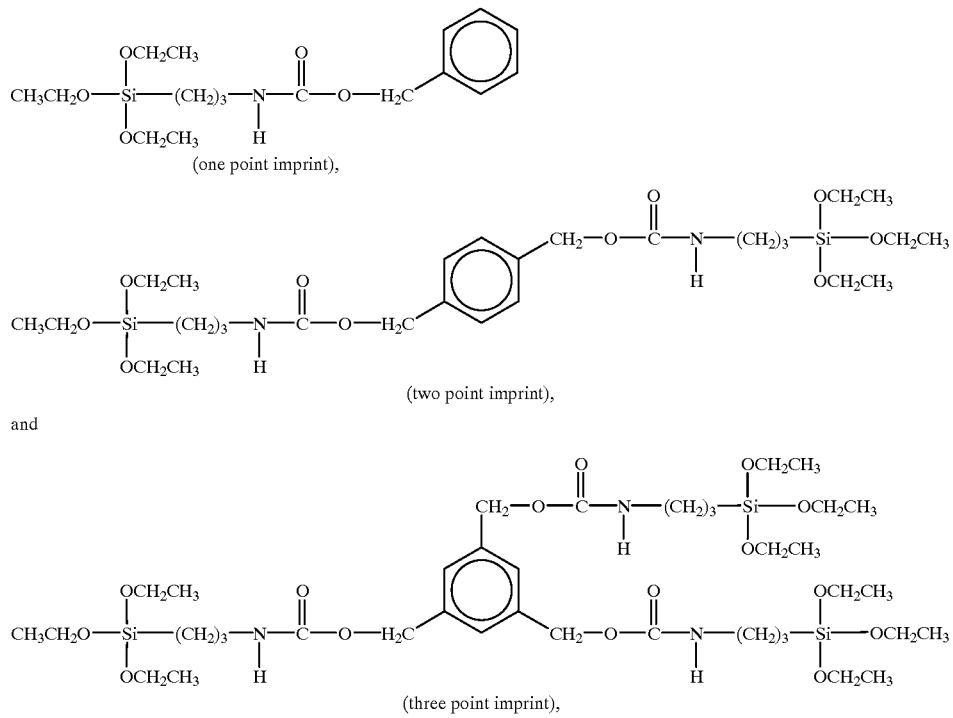

In another example, the one or more organic moieties may be an alkylidene or a carbene complex including ruthenium or osmium such as those described by U.S. Pat. Nos. 5,710,298, 5,312,940, 5,342,909 issued to Grubbs and co-workers which are also incorporated herein by reference. These ruthenium or osmium complexes are used in various olefin metathesis reactions including ring opening polymerization, ring closing polymerization, and telechelic polymerization.

Figure 1B:
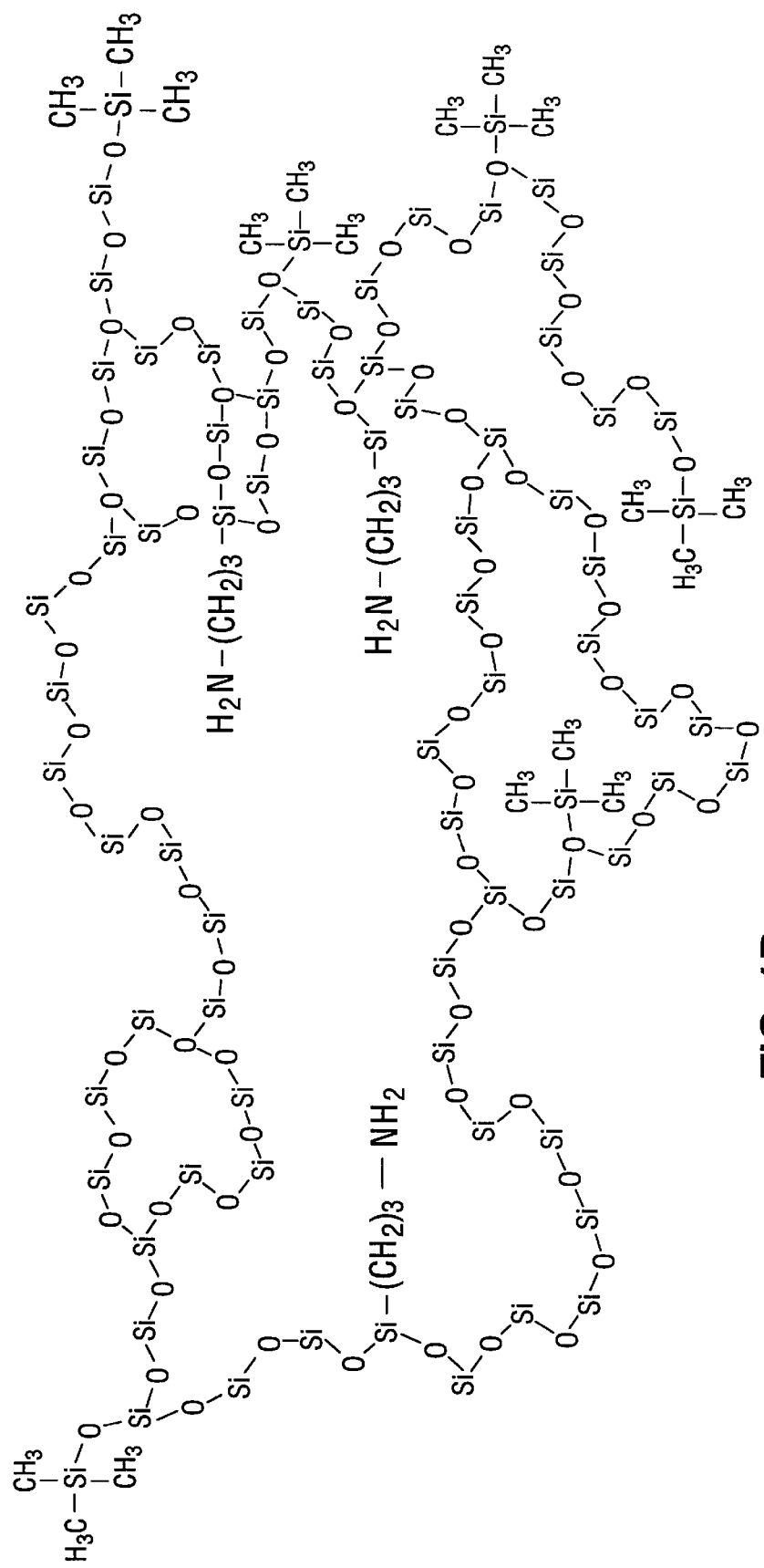
FIG. 1B is a schematic of the functionalized void space resulting from the three point imprint compound.

Much like the biological counterparts, the resulting functionalized amorphous silica may be used for performing chiral separation and/or catalysis. The principles of chiral recognition are guided by the three point rule of Dalgliesh For example, FIG. 1A is a schematic of the capped material for the three point imprint compound. As shown, the would-be imprinted site is taken up by the imprint compound which is crosslinked to the silica gel framework. FIG. 1B is the corresponding area (in the final product) after the carbamate bond has been cleaved in the three point imprint. Removal of the bulk of the imprint compound leaves a void of defined size and shape with three spatially organized amine groups formed therein.

Structures of the synthetic precursors and the respective final products were confirmed using various spectroscopic methods. In the case of the one, two, and three point imprinted silica gels, these spectra confirmed that the bulk of the organizing moieties, Z, were removed and that the remaining organic moieties were intact and tethered to the silica framework. The FT-Raman spectra for the final products showed a significant decrease in the benzene ring breathing band at 1001 cm$^{-1}$ and virtually no change in the Si—CH$_2$—R band at around 1212 cm$^{-1}$ when compared with the corresponding as-made materials. Similarly, $^{13}$C CP/MAS NMR showed the presence of the propyl group with resonances at 42.8, 21.0, and 10.2 ppm, which are consistent with literature values for a propyl chain tethered off a silica framework and covalently bound to a primary amine, and a significant decrease in the intensity of the resonance at 129.8 ppm which corresponds to the phenyl group.

Moreover, FTIR and fluorescent probe experiments indicate that the functionalized voids are discrete and homogeneously distributed within the amorphous silica framework. In the one, two, and three point imprinted materials, BET surface areas were approximately 260 m$^2$/g with a median pore diameter of approximately 10 Å.

In one set of experiments, benzoic acid binding experiments were used to assess shape selectivity of the inventive polymers. For example, benzoic acid (5.6×10$^{-4}$ M in chloroform), an analog for

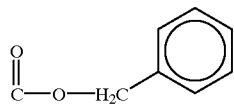

(the portion of the one point imprint that is subsequently removed from the one point imprinted polymer) was equilibrated with 10 mg of one point imprinted amorphous silica, non-imprinted amorphous silica, and the as-made one point amorphous silica for 24 hours at room temperature. Although neither the non-imprinted amorphous silica nor the as-made one point amorphous silica displayed any appreciable adsorption (less than 1.3%), the one-point imprinted material adsorbed 41.5% of the benzoic acid or 62.2% of the theoretical maximum in this case.

To verify the catalytic accessibility of the amine groups in the deprotected imprinted materials, the Knoevenagel condensation of benzaldehyde with malononitrile was performed.

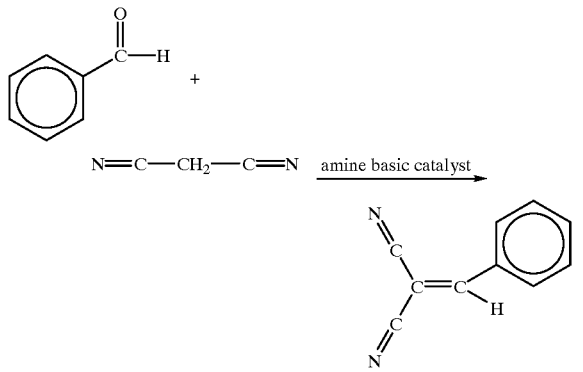

Figure 2:
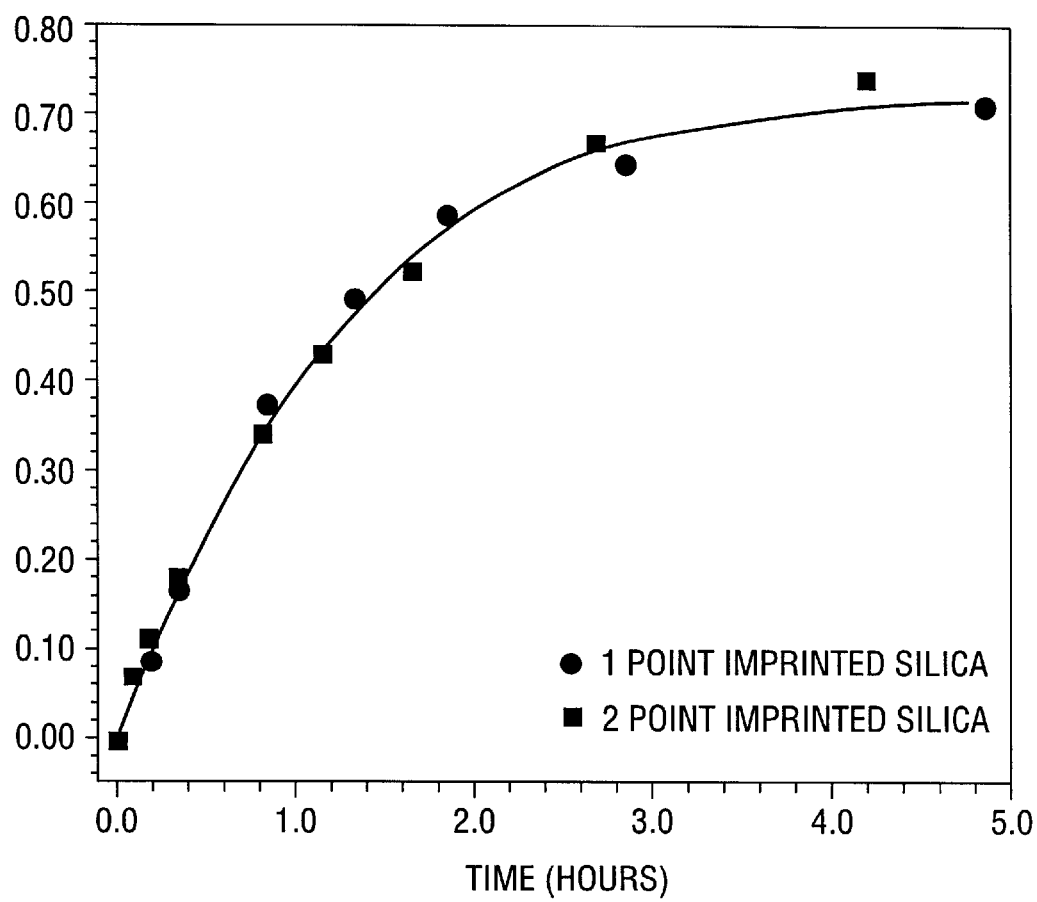
FIG. 2 is a graph of the percent yield of product versus time for the Knoevenagel condensation of malononitrile and benzaldehyde.

Briefly, 1.5 mmol of benzaldehyde and malononitrile were combined in 20 ml of cyclohexane solvent with 6 mg of hexamethylbenzene as the internal standard at 70° C. 60 mg of imprinted silica containing approximately 0.2 mmol/g of primary amine sites was used as the catalyst. The product yield of the reaction versus time is shown in FIG. 2. The background rates for the catalysis conditions employed were significantly smaller than the observed rates with the imprinted materials which are likely mass-transfer limited. These results indicate that the imprinted amines are accessible to the reagents benzaldehyde and malononitrile and can act as catalytically active sites for the transformation above.

In another set of experiments, shape selective catalysis was demonstrated by the Knoevenagel condensation of isophthalaldehyde with malononitrile.

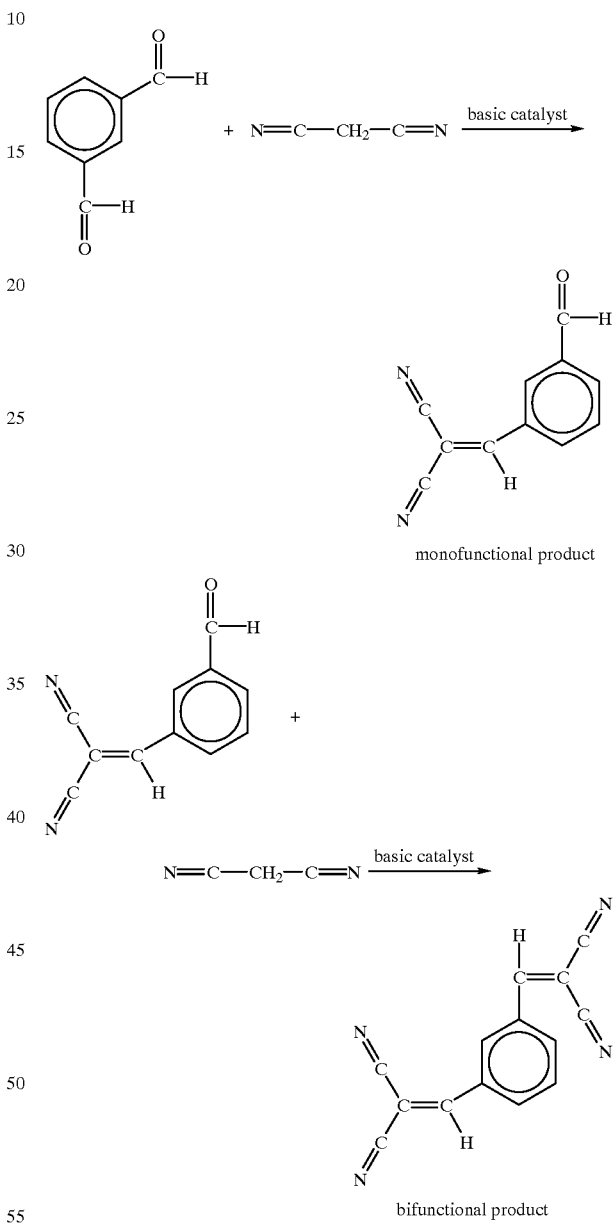

Figure 3:
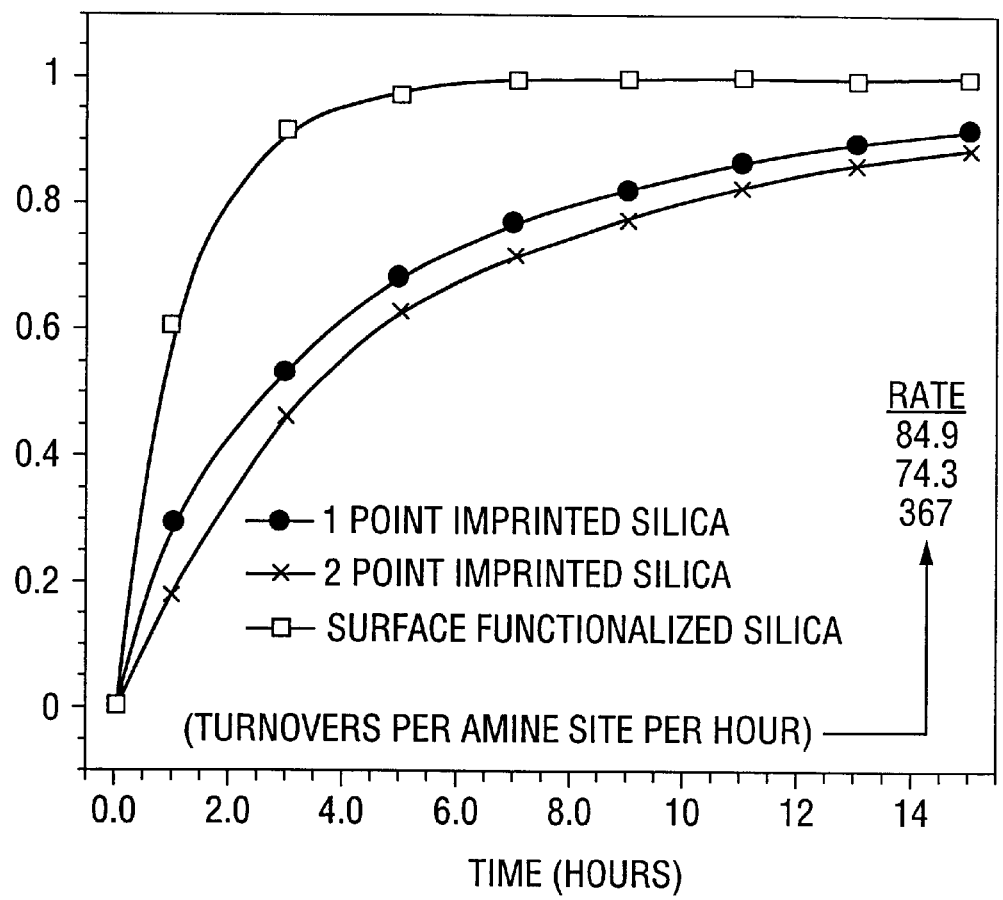
FIG. 3 is a graph of the conversion of isophthalaldehyde versus time for the Knoevenagel condensation of isophthalaldehyde and malononitrile.

Briefly, 1.5 mmol isophthalaldehyde and 3.0 mmol malononitrile were combined in 5 ml acetonitrile with 8 mg hexamethylbenzene as the internal standard at 80° C. 30 mg of one point imprint or two point imprint containing approximately 0.2 mmol/g of primary amine sites, or 6 mg of surface functionalized silica containing approximately 1 mmol/g of primary amine sites was used as a catalyst. The conversion of isophthalaldehyde versus time is shown in FIG. 3.

Although all of the catalysts (one point imprinted silica, two point imprinted silica, and surface functionalized silica)

catalyzed the reaction of isophthalaldehyde to the monofunctional product, only the surface functionalized silica further catalyzed the reaction of the monofunctional product to the bifunctional product. In other words, the one and two point imprinted silicas displayed shape selectivity with respect to the reactants, differentiating between the isophthalaldehyde and the monofunctional product, while the surface functionalized silica did not.

Figure 4:
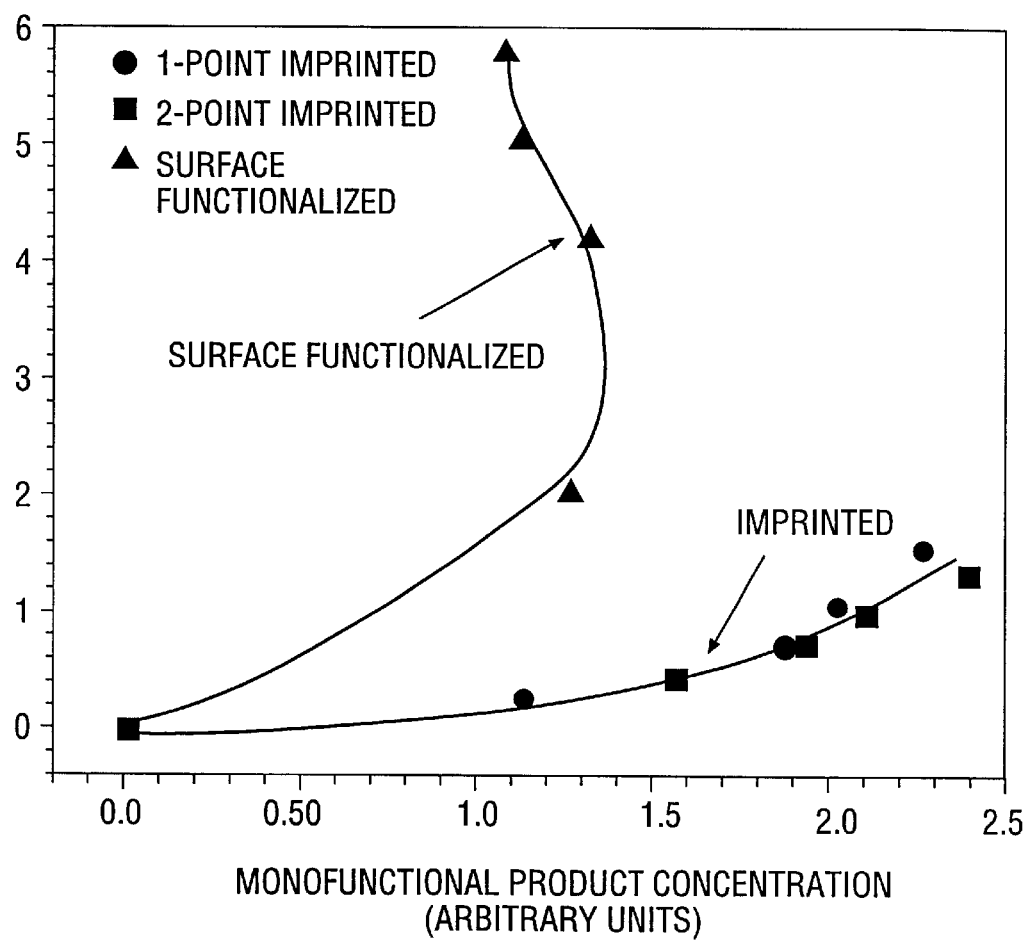
FIG. 4 is a phase plot for the same reaction as in FIG. 3 showing the reaction trajectories of the surface functionalized and imprinted catalyst for the reaction of the monofunctional product to the bifunctional product.

The subsequent conversion of the monofunctional product to the bifunctional product is illustrated by FIG. 4, which is a phase plot showing the reaction trajectories of the surface functionalized and imprinted catalysts. Although some amount of the bifunctional product is produced, the trajectory for the imprinted catalysts follows a path that produces significantly less bifunctional product for the same amount of monofunctional product in solution. Further investigation has shown that the rate of bifunctional product formed can be attributed to background (thermal) reaction of the monofunctional product in solution with malononitrile for the imprinted materials.

As these experiments show, the inventive imprinted materials are capable of adsorption and catalysis in a substrate specific manner. Much like enzymes, a diverse set of voids can be made by varying the component parts of the imprint compound. In addition, the one or more functional groups formed in the voids may be further modified. For example, the amines of the one, two, and three point imprinted amorphous silica may be subsequently reacted (i.e., alkylation, conversion into amides) to produce new functionalities using standard organic protocols.

EXAMPLE 1
Synthesis of 3-(triethoxylsilyl)propyl-benzylcarbamate ("TPBC"): one-point imprint To 50 ml of anhydrous ether was added 10 ml of 3-aminopropyltriethoxysilane. Subsequently 5.6 ml of triethylamine was added. Under ice cooling 5.7 ml of benzyl chloroformate was added dropwise to this mixture via a dry syringe. The reaction mixture was stirred for 1 hour at room temperature, evaporated to an oil, redissolved in chloroform, and extracted with pH 2.0 aqueous HCl, saturated sodium bicarbonate, and saturated brine. The organic phase was dried over magnesium sulfate and purified by flash chromatography. The final product was recovered as a transparent oil (yield 80%). $^1$H NMR (CDCl$_3$): 0.620 (2H, t, C$\underline{H}_2$); 1.21 (3H, t, OCH$_2$C$\underline{H}_3$); 1.56–1.66 (2H, m, C$\underline{H}_2$); 3.13–3.2 (2H, m, C$\underline{H}_2$); 3.8 (2H, q, OC$\underline{H}_2$CH$_3$); 5.07 (2H, brs, C$\underline{H}_2$O); 5.30 (1H, t, N$\underline{H}$); 7.25–7.33 (5H, m, Ar—H). $^{13}$C{$^1$H} NMR (CDCl$_3$): 8.13 (C$\underline{H}_2$); 18.8 (OCH$_2$C$\underline{H}_3$); 23.8 (C$\underline{H}_2$); 44.0 (C$\underline{H}_2$); 58.9 (OC$\underline{H}_2$CH$_3$); 66.9 (C$\underline{H}_2$O); 128.5 (C$\underline{H}$); 128.6 (C$\underline{H}$); 130.0 (C$\underline{H}$); 137.3 (C$_q$); 157 (C=O). $^{29}$Si NMR (CDCl$_3$): −45.61 ($\underline{Si}$(OCH$_2$CH$_3$)$_3$CH$_2$). Anal. Calcd. for C$_{17}$H$_{29}$O$_5$NSi: C, 57.43; H, 8.22; N, 3.94; Si, 7.90. Found: C, 57.54; H, 8.56; N, 4.05; Si, 7.96.

EXAMPLE 2
Synthesis of [3-(triethoxylsilyl)propyl]-1,4-phenylenebis(methylene)carbamate: two-point imprint To 3.892 g of 1,1′-carbonyldiimidazole was added 20 ml of dry tetrahydrofuran ("THF"). A catalytic amount of sodium ethoxide (ca 5 mg) was added to the mixture. Subsequently 1.658 g of 1,4-benzenedimethanol was dissolved in 20 ml of dry THF and was added dropwise under ice cooling to the reaction mixture. The flocculent precipitate formed was redissolved by heating the reaction mixture to ca 50° C., and the reaction mixture was allowed to stir for an additional 1 hour at room temperature. Subsequently 6.20 ml of 3-aminopropyltriethoxysilane were added dropwise under ice cooling. The reaction mixture was allowed to stir for an additional 3 hours at room temperature and was monitored by TLC. The THF was evaporated and the crude product was redissolved in ether. Excess imidazole was removed by vacuum filtration, and the crude product was purified by silica chromatography with Silica Gel 60 using 1.4/1.0 hexane:ethyl acetate as eluent. The solid recovered from the silica gel column was recrystallized in chloroform/hexane to give white platelets (yield 41%). $^1$H NMR (CDCl$_3$): 0.624 (4H, t, C$\underline{H}_2$); 1.21 (6H, t, OCH$_2$C$\underline{H}_3$); 1.57–1.67 (4H, m, C$\underline{H}_2$); 3.15–3.22 (4H, m, C$\underline{H}_2$); 3.81 (4H, q, OC$\underline{H}_2$CH$_3$); 5.07 (4H, brs, C$\underline{H}_2$O); 5.17 (2H, t, N$\underline{H}$); 7.32 (4H, s, Ar—H). $^{13}$C{$^1$H} NMR (CDCl$_3$): 7.63 (C$\underline{H}_2$); 18.3 (OCH$_2$C$\underline{H}_3$); 23.3 (C$\underline{H}_2$); 43.5 (C$\underline{H}_2$); 58.5 (OC$\underline{H}_2$CH$_3$); 66.2 (C$\underline{H}_2$O); 128.2 (C$\underline{H}$); 136.6 (C$_q$); 156.4 (C=O). $^{29}$Si NMR (CDCl$_3$): −45.7 ($\underline{Si}$(OCH$_2$CH$_3$)$_3$CH$_2$). Anal. Calcd for C$_{28}$H$_{52}$O$_{10}$N$_2$Si$_2$: C, 53.14; H, 8.28; N, 4.43; Si, 8.87. Found: C, 53.22; H, 8.48; N, 4.37; Si, 8.74.

EXAMPLE 3
Synthesis of [3-(triethoxylsilyl)propyl]-1,3 5-benzenetriyltris(methylene)carbamate: three-point imprint To 5.837 g of 1,1′-carbonyldiimidazole was added 20 ml of dry THF. A catalytic amount of sodium ethoxide (ca 5 mg) was added to the mixture. Subsequently 2.018 g of 1,3,5-benzenetrimethanol were dissolved in 20 ml of dry THF and was added dropwise under ice cooling to the reaction mixture. The reaction mixture was stirred for 1.75 hours at room temperature. Subsequently, 9.31 ml of 3-aminopropyltriethoxysilane were added dropwise while the reaction mixture was cooled with ice. The reaction mixture was allowed to stir for an additional 2 hours at room temperature and was monitored by TLC. The THF was evaporated and the crude product was redissolved in ether. Excess imidazole was removed by vacuum filtration, and the crude product was purified by silica chromatography with Silica Gel 60 using 1.4/1.0 hexane:ethyl acetate as eluent. A white wax-like solid was recovered from the silica gel column (yield 55%). $^1$H NMR (CDCl$_3$): 0.632 (6H, t, C$\underline{H}_2$); 1.22 (9H, t, OCH$_2$C$\underline{H}_3$); 1.58–1.68 (6H, m, C$\underline{H}_2$); 3.15–3.22 (6H, m, C$\underline{H}_2$); 3.81 (6H, q, OC$\underline{H}_2$CH$_3$); 5.05 (6H, brs, C$\underline{H}_2$O); 5.30 (3H, t, N$\underline{H}$); 7.25 (6H, s, Ar—H). $^{13}$C{$^1$H} NMR (CDCl$_3$): 7.61 (C$\underline{H}_2$); 18.3 (OCH$_2$C$\underline{H}_3$); 23.3 (C$\underline{H}_2$); 43.5 (C$\underline{H}_2$); 58.4 (OC$\underline{H}_2$CH$_3$); 66.0 (C$\underline{H}_2$O); 127.1 (C$\underline{H}$); 137.4 (C$_q$); 156.3 (C=O). $^{29}$Si NMR (CDCl$_3$): −45.7 ($\underline{Si}$(OCH$_2$CH$_3$)$_3$CH$_2$). Anal. Calcd for C$_{39}$H$_{75}$O$_{15}$N$_3$Si$_3$: C, 51.46; H, 8.30; N, 4.62; Si, 9.26. Found: C, 51.48; H, 8.50; N, 4.53; Si, 9.12.

EXAMPLE 4
Synthesis of Imprinted Silica Gel

All imprinted materials were synthesized according to the following protocol. The amount of the imprint compound used in the synthesis corresponds to about 2 mol % of imprint Si relative to the source of silica, tetraethylorthosilicate ("TEOS").

In a typical procedure, 0.7338 g of one-point imprint (0.6532 g of two-point imprint or 0.6263 g of three-point imprint) was dissolved into 193.5 ml of dry ethanol in a 16 ounce jar (Qorpak 7534). 23.0 ml of TEOS were added to this mixture. Finally 64.5 ml of pH 2.0 aqueous HCl were added to the gel mixture. The mixture was covered loosely with a jar cap and stirred for 24 hours at 8° C. It was then covered with wax paper and stirred for 12 hours at 15° C. and 8 days at room temperature. With approximately ¾ of an inch liquid head remaining in the jar after this period, the mixture was transferred to a 40° C. oven and covered loosely with a jar cap. The mixture was aged in the oven for 10 days after which time gelation had occurred and the caps were removed. The resulting glass monoliths were further aged in the oven for a period of 8 days. The final gels had an approximate imprint content of 0.283 mmol imprint nitrogen/g of as-made material, as determined by a mass balance on the as-made material. A thermogravimetric analysis of the as-made materials showed that the gels can be heated to over 200° C. in air without decomposition of imprint if such further processing was desired.

EXAMPLE 5

Imprint Extraction

The as-made imprinted silica monoliths were ground into a powder of particles less than 10 µm in diameter via a ball mill, a mechanized mortar and pestle, and repetitive wet-sieving in dry ethanol. The resulting powder was dried under ambient conditions and Soxhlet extracted with acetonitrile refluxing in calcium hydride for a period of 24 hours to remove water and ethanol from the amorphous silica. The amorphous silica was then separately washed with 25 ml/g of silica with chloroform and pentane and allowed to dry. At this stage the imprinted material is referred to as "extracted." The extracted material is further processed by capping OH-defect sites on the surface with an equimolar mixture of 1,1,1,3,3,3-hexamethyldisilazane and chlorotrimethylsilane at room temperature for 24 hours ("capped material"). Typical weight increases before/after the capping procedure are approximately 3–5 weight %. Subsequent to the capping procedure, the silica was washed with 50 ml/g of silica with anhydrous THF, anhydrous acetonitrile, chloroform, and pentane, and allowed to dry in a desiccator under ambient conditions. The washed and capped material is then at the stage of imprint removal via carbamate deprotection.

Various NMR spectroscopic data confirm the structures of the synthetic precursors and the final imprinted material. For example, in the three point imprint as-made material, most of the imprint compounds were found to be bound to the silica framework via the three propyl tethers. The remaining small portion of the imprint compound were bound via two tethers. There was no detectable imprint compounds that were bound with only one tether. Further characterization using $^{29}$Si block decay NMR on the capped materials showed that most of the framework silicon is fully condensed ($Q_4$ silicon) with almost all of the remainder being three-fourths condensed ($Q_3$ silicon).

EXAMPLE 6

Interaction between the Imprint Compound and the Amorphous Silica Framework

The intermolecular interaction of silicon with carbonyl-containing molecules, such as between the silicon framework and the imprint compound, can provide the necessary driving force for the formation of shape-selective cavities. The magnitude of these interactions was assessed by performing FTIR experiments in three environments: a gas phase-type environment afforded by a 0.01M solution of imprint in $CCl_4$, an imprint-rich environment afforded by pure imprint, and the imprint imbedded in the as-made and capped imprinted materials. The significant carbonyl stretch absorbance was monitored for evidence of intermolecular association between imprint and the silica framework. The results are represented in Table 1.

TABLE 1

|  | 0.01 M in $CCl_4$ | Pure Imprint | Imprinted Material[b] |
|---|---|---|---|
| one-point | 1728 (1) cm$^{-1}$ | 1728 (1) cm$^{-1a}$ | 1701 (5) cm$^{-1}$ |
| two-point | 1730 (1) cm$^{-1}$ | 1685 (1) cm$^{-1}$ | 1701 (4) cm$^{-1}$ |
| three-point | 1730 (1) cm$^{-1}$ | 1691 (1) cm$^{-1}$ | 1703 (3) cm$^{-1}$ |

[a]Value represents Fourier self-deconvolution of double peak comprising carbonyl stretch in neat one-point imprint. The two peaks obtained by this procedure gave absorbance maxima at 1728 cm$^{-1}$ and 1703 cm$^{-1}$, respectively. It is postulated that the origin of the latter absorbance is an associated form of the imprint because this resonance disappears in the carbon tetrachloride sample, where only the former absorbance remains (supposedly corresponding to monomeric imprint species).
[b]Value represents carbonyl absorbance in as-made and capped imprinted materials. The difference in the frequency of the absorption between the two materials was less than the error given in parentheses.

The third column in Table 1 represents the imprint in the environment of the as-made and capped imprinted material. The frequency of the imprint carbonyl stretch in both of these environments was the same, despite the fact that the general solvation environment (dictated by the silica framework) changed from hydrophilic in the as-made material to hydrophobic in the capped material. This independence of the carbonyl stretching frequency with the bulk solvation of the framework suggests that the atomic-level interactions between the silica and the imprint were being probed here.

The case of the one-point material is quite dramatic in that the carbonyl frequency is shifted to the lower frequency region by 27 cm$^{-1}$ in comparison with the essentially non-interacting $CCl_4$ environment. This shift is consistent with a strong interaction between the silica framework of the material and the imprint carbonyl. Amide II absorption data of 1540 cm$^{-1}$ and 1530 cm$^{-1}$ for the imprint in the one-point material and the pure imprint, respectively, provide further evidence. Because the frequency of the amide II absorption tends to increase with a greater degree of hydrogen bonding interaction, these results suggest that a significant interaction exists between the carbamate of the one-point imprint and the silica framework. In fact, a stronger intermolecular association between the one-point imprint and the silica framework appears to exist than that exhibited for the neat one-point imprint.

The interaction between the silica framework and the two- and three-point imprints appear to be similar to that for the one-point imprint. The carbonyl absorbance shifts towards the lower frequency region (hence greater carbonyl intermolecular interaction) were 29 cm$^{-1}$ and 27 cm$^{-1}$ for the two-point and three-point imprints, respectively, when compared with the non-interacting $CCl_4$ environment. The frequency of the carbonyl stretch for the two- and three-point imprinted materials is not as low as for the compounds in the pure imprint environment, suggesting a greater intermolecular interaction involving the carbonyl in the crystalline, pure two- and three-point imprints compared with the corresponding imprinted material.

In addition, the imprint compounds appear to be well-dispersed within the silica framework. That is to say, local clumping of imprint compound relative to one another does not appear to exist. If it were, the frequency observed for the carbonyl stretch (and amide II band) would be consistent with the frequency observed in the pure imprint. This conclusion will be further reinforced with fluorescence characterization provided below.

Other interactions involving the amide and carbonyl functionality of the carbamate with the silica framework, such as Van der Waals and electrostatic interactions, between parts of the imprint molecule and the silica framework are anticipated to also contribute to the driving force for shape-selective cavity formation.

EXAMPLE 7
Extracted Imprinted Material Characterization

Figure 5:
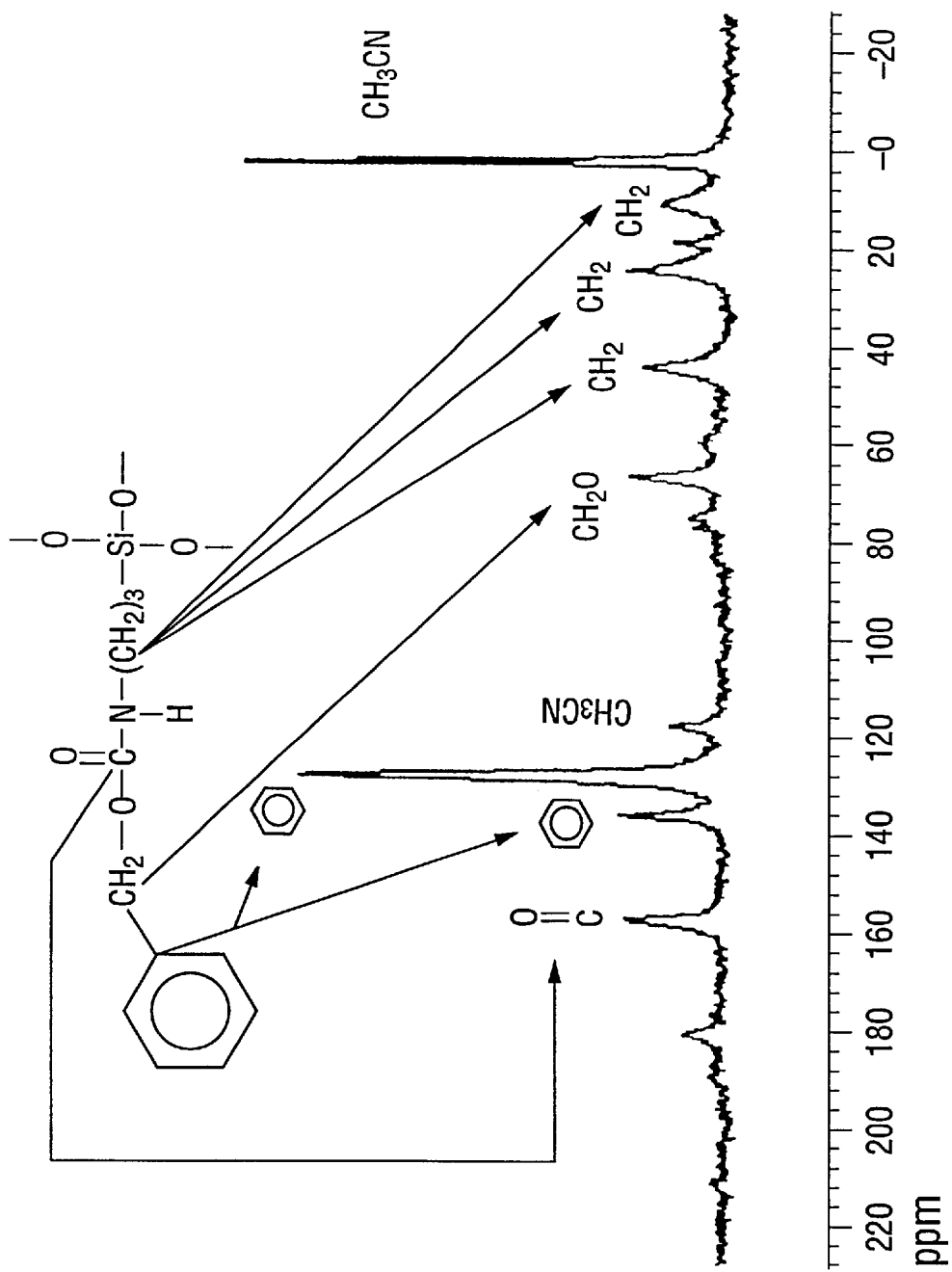
FIG. 5 is a $^{13}$C CP/MAS NMR of the one-point imprinted silica. Resonances attributable to acetonitrile remaining adsorbed in the material following extraction are labelled. Typically these spectra contain ethoxy methylene and methyl resonances that are barely detectable above baseline and are indicative of the high degree of hydrolysis (>99%) in the imprinted silica materials.

One of the most sensitive methods of characterizing the imprinted silicas is $^{13}$C CP/MAS NMR. FIG. 5 shows a typical NMR spectrum for the extracted 1-point material. The spectrum proves that the imprint is intact following the imprinted material synthesis and extraction procedure. The following are the resonance assignments for the one-, two-, and three-point materials. CP-MAS $^{13}$C NMR of extracted 1-point material: 9.5 ($CH_2$); 23.2 ($CH_2$); 43.5 ($CH_2$); 67.4 ($CH_2O$); 128.7 ($CH$); 136.8 ($C_q$); 158.7 ($C=O$). CP-MAS $^{13}$C NMR of extracted 2-point material: 9.6 ($CH_2$); 23.8 ($CH_2$); 43.9 ($CH_2$); 67.4 ($CH_2O$); 128.2 ($CH$); 137.4 ($C_q$); 158.2 ($C=O$). CP-MAS $^{13}$C NMR of extracted 3-point material: 9.2 ($CH_2$); 22.6 ($CH_2$); 43.5 ($CH_2$); 66.9 ($CH_2O$); 126.5 ($CH$); 137.8 ($C_q$); 158.7 ($C=O$).

Figure 6:
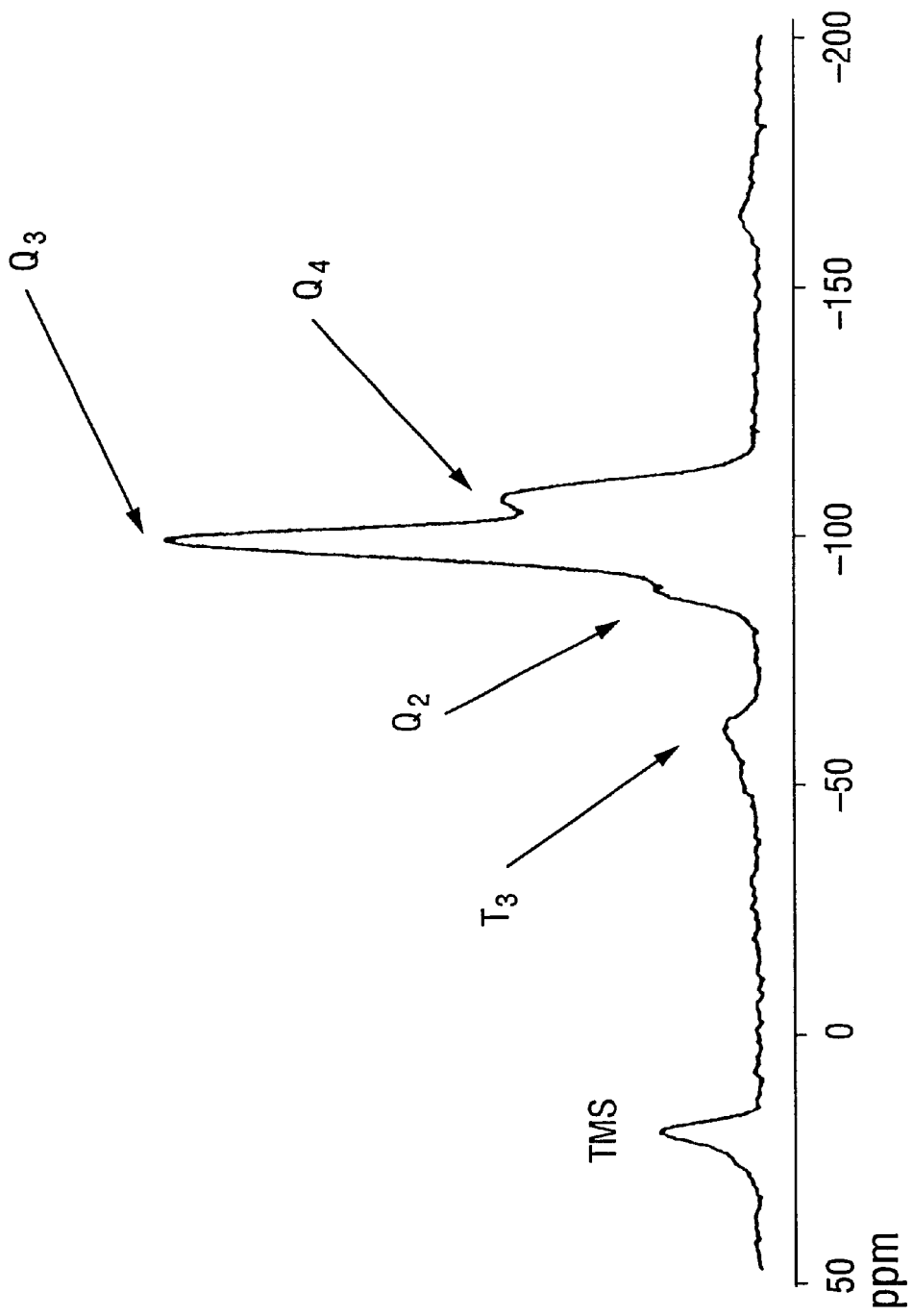
FIG. 6 is a $^{29}$Si CP/MAS NMR of the one-point imprinted silica. Corresponding resonances are labelled wherein Q4 corresponds to $(\underline{Si}O)_4$, $Q_3$ corresponds to $(SiO)_3\underline{Si}-(O^-)$, $Q_2$ corresponds to $(SiO)_2\underline{Si}-(O^-)_2$, $T_3$ corresponds to $(SiO)_3\underline{Si}-C$, and TMS corresponds to $(SiO)\underline{Si}(CH_3)_2$. There is a slight asymmetry in the $T_3$ labelled resonance that may indicate the presence of a small fraction (ca 5%) of $T_2$ species corresponding to $(SiO)_2C\underline{Si}-(O^-)$.
Figure 7:
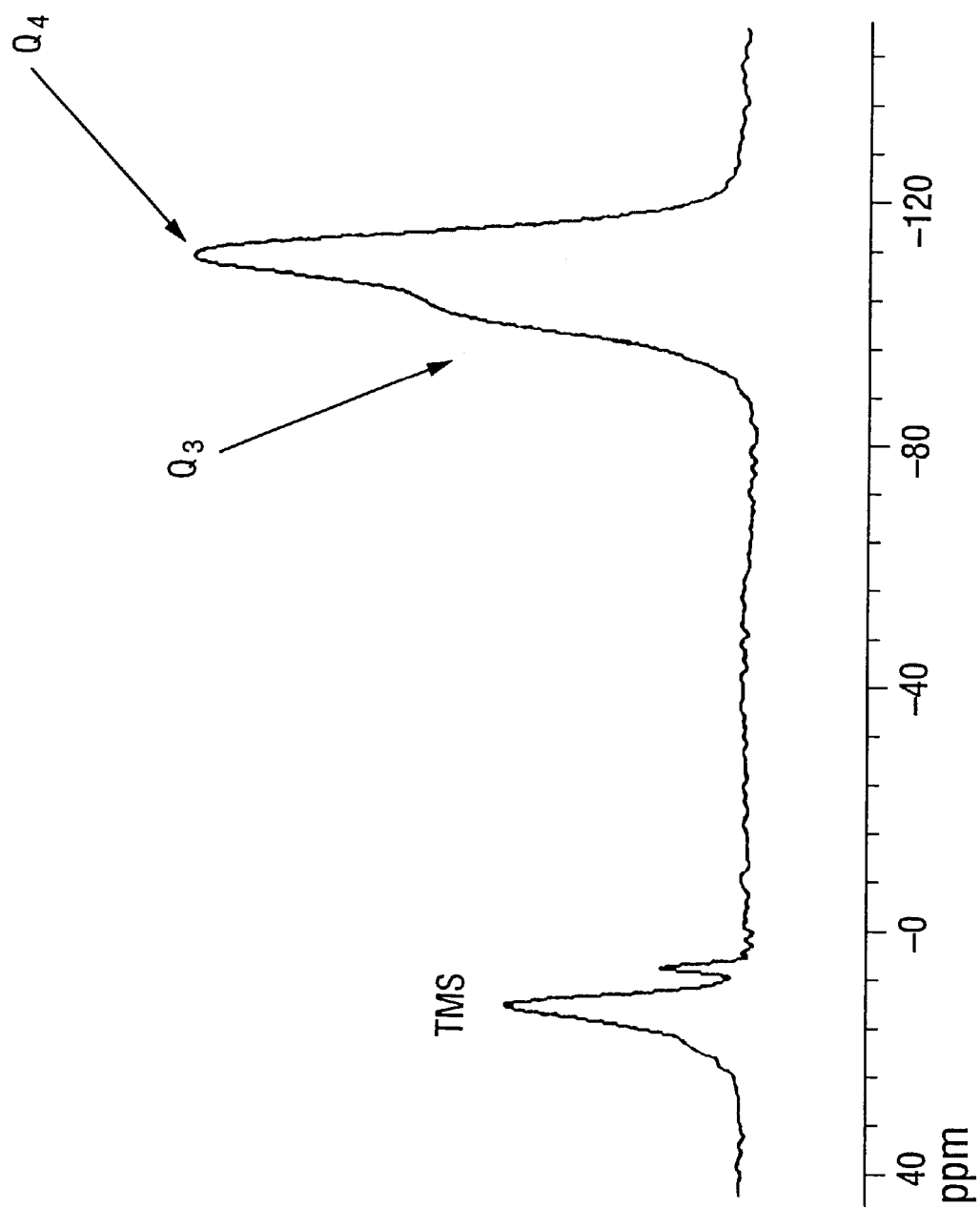
FIG. 7 is a $^{29}$Si block decay NMR of reference material which was carried through the entire imprinting deprotection process.

Capped Imprinted Material Characterization $^{29}$Si CP/MAS NMR was used to probe the silicon environment in the imprinted materials subsequent to the capping procedure. FIG. 6 shows such a typical NMR spectrum for a capped one-point material.

Most of the imprint is bound to the silica framework with all three covalent anchors afforded by the three ethoxy groups on the unhydrolyzed imprint silicon ($T_3$ silicon). Only a small fraction of the imprint is bound to the framework with two of the three possible anchors of each imprint silicon atom ($T_2$ silicon), and there is no detectable imprint bound to the framework with less than two anchors per imprint silicon atom ($T_1$ silicon). The environment of the silicon comprising the material framework can be probed by $^{29}$Si block decay NMR on the capped materials. The results of this indicate that most of the silicon comprising the material framework is fully condensed ($Q_4$ silicon), and some (ca 30%) is three-fourths condensed ($Q_3$ silicon). There was little silicon detectable to be less than three-fourths condensed in the material framework from the $^{29}$Si block-decay NMR spectra. A typical block decay spectrum is shown in FIG. 4 for a reference silica prepared in the absence of imprint and onto which the entire imprinting process, from extraction to deprotection, was carried out.

EXAMPLE 8
Controlling for Any Unintended Affects of Imprint Removal

The one, two, and three point imprint molecules were respectively removed from the imprinted amorphous silica using similar techniques. In general, any suitable technique that selectively cleaves the carbamate carbon-nitrogen bonds without affecting the silica framework may be used. To assess a potential method's effect on the silica framework, the open, porous structure of the zeolite silicon Faujasite (Tosoh MUA-390 with Si/Al ca 300) was used as a substitute for the amorphous silica. Because the zeolite is crystalline, x-ray powder diffraction was used to assess whether the decoupling method affected its structural integrity. For example, the common practice of using base such as sodium peroxide to cleave the carbamate bond was found to degrade the silica framework of the zeolite and hence would be unsuitable for use in the practice of the present invention.

As a result, an alternate protocol using the Lewis acid trimethylsilyliodide ("TMSI"), which cleaves benzyl carbamates to amines and benzyl iodides via a silyl carbamate intermediate, was used. The homogeneous deprotection of benzyl carbamates in the one, two, and three point imprinted amorphous silica proceeds at 100% yield at room temperature in less than 6 minutes with 0.12 M TMSI in acetonitrile. Neither higher concentration of TMSI (0.25 M) nor higher temperature (40° C.) for four hours affected the zeolite structure.

TMSI Protocol

A 0.25 M solution of TMSI in dry acetonitrile is prepared under argon atmosphere. 10 ml of this solution per gram of silica to be deprotected are transferred to the silica under argon. The resulting slurry is stirred in the dark at 40° C. for the one-point material (70° C. for 2-point and 80° C. for 3-point) for a period of 12 hours. The deprotected silica is collected via vacuum filtration and washed with 30 ml/g of silica with dry acetonitrile, methanol, saturated aqueous sodium bicarbonate, methanol, and acetonitrile. The deprotected silica is then Soxhlet extracted for 24 hours each with acetonitrile refluxing in calcium hydride and chloroform. Finally, the silica is washed with 25 ml per gram of silica separately with chloroform and pentane, and dried in a desiccator under ambient conditions. The deprotection reaction was followed by $^{13}$C CP/MAS NMR. As the reaction proceeds, the carbonyl and methylene resonances of the carbamate functionality and the benzyl resonance almost completely disappear relative to the methylene resonances comprising the propyl tethers. FIG. 8 shows the result of a typical deprotection procedure as followed by $^{13}$C CP/MAS NMR for a one- and two-point materials. The resonance assignments for the one-, two-, and three-point material were: CP-MAS $^{13}$C NMR of the deprotected one-point material: 9.7 ($CH_2$); 22.9 ($CH_2$); 42.8 ($CH_2$); 129 ($CH$) (weak). CP-MAS $^{13}$C NMR of the deprotected two-point material: 10.5 ($CH_2$); 23.1 ($CH_2$); 43.2 ($CH_2$). (The two-point material also shows some residual ethoxy moieties resulting from incomplete condensation and hydrolysis at 54.1 ($CH_3CH_2O$) and 17.5 ($CH_3CH_2O$) ppm). CP-MAS $^{13}$C NMR of the deprotected three-point material: 10.1 ($CH_2$); 21.7 ($CH_2$); 43.0 ($CH_2$); 128.1 ($CH$) (weak); 139.2 ($CH$) (weak); 158.9 ($C=O$) (weak).

Figure 9:
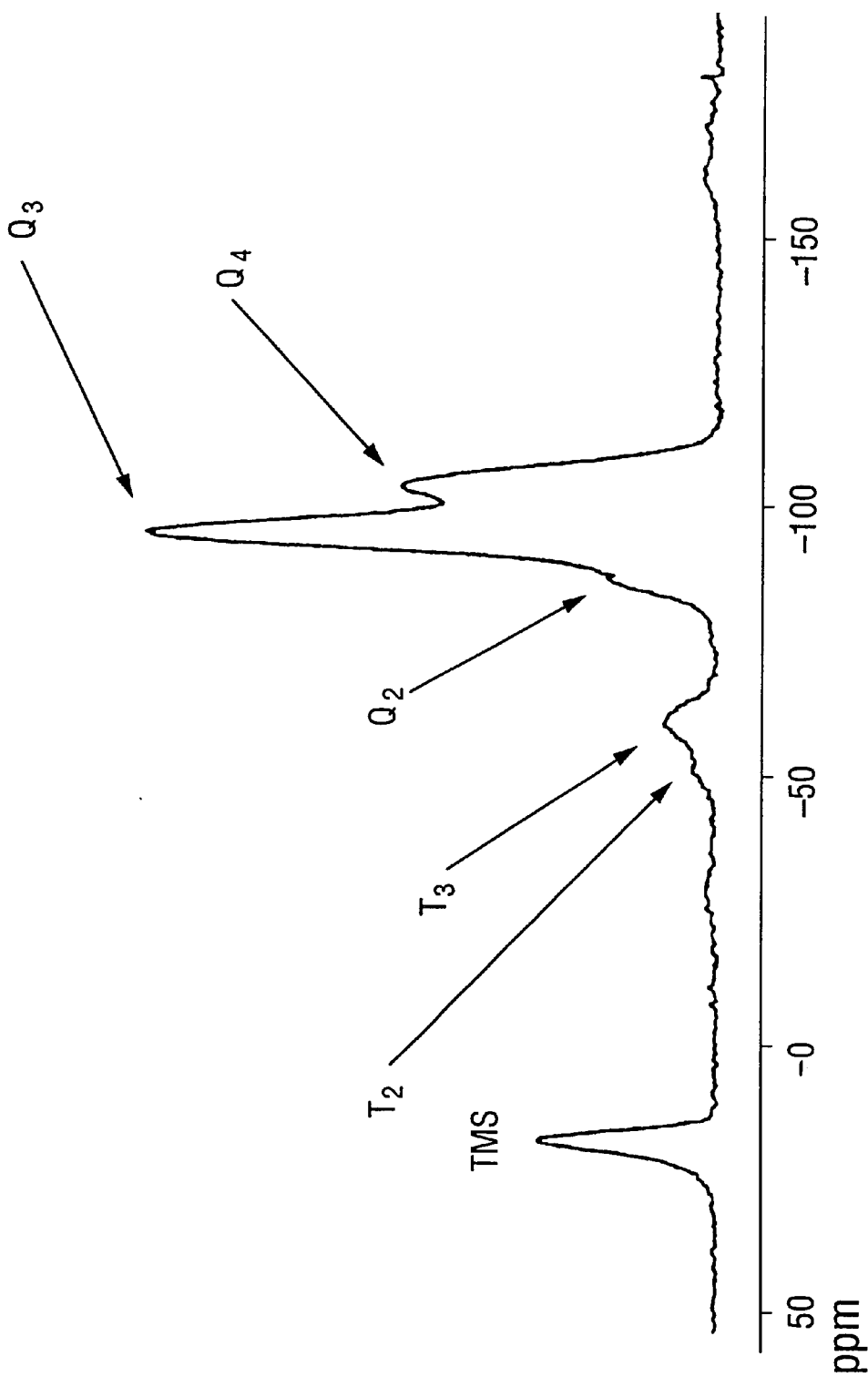
FIG. 9 is a $^{29}$Si CP/MAS NMR of one-point imprinted silica after the deprotection procedure.

FIG. 9 shows the result of the deprotection procedure on the degree of condensation of the organosilicon for the same material as shown in FIG. 6.

This characterization is important because it provides evidence about the local degree of condensation adjacent to the place where carbamate deprotection is being performed. One could envision that although there is no bulk reaction of the TMSI with the silica framework, some hydrolysis may occur locally surrounding the region where deprotection is taking place. The data in FIG. 9 suggest, however, that this is not the case, as the degree of organosilicon condensation is the same before and after deprotection (see FIG. 6 for comparison).

EXAMPLE 9
Amine Accessibility in the Final Product

Benzoic acid was adsorbed into one point, two point and three point imprinted amorphous silicas to quantify the number of amines generated during deprotection. Assuming that one benzoic acid forms a salt bridge with a single amine, the number of sites was counted by using UV-spectrophotometry and a material balance on benzoic acid. The results are shown in Table 2.

TABLE 2

| Material | Number of Amine Sites (mmol/g) | % cleavage |
| --- | --- | --- |
| one point | 0.2230 | 73% |
| two point | 0.2188 | 70% |
| three point | 0.0442 | 14% |

All imprinted materials have amines resulting from the deprotection process. For comparison, this procedure resulted in no detectable levels of benzoic acid (less than 1.3% of the initial number of imprinted sites) being adsorbed by the capped imprint-containing materials.

EXAMPLE 10
Imprinted Site Homogeneity

Figure 12:
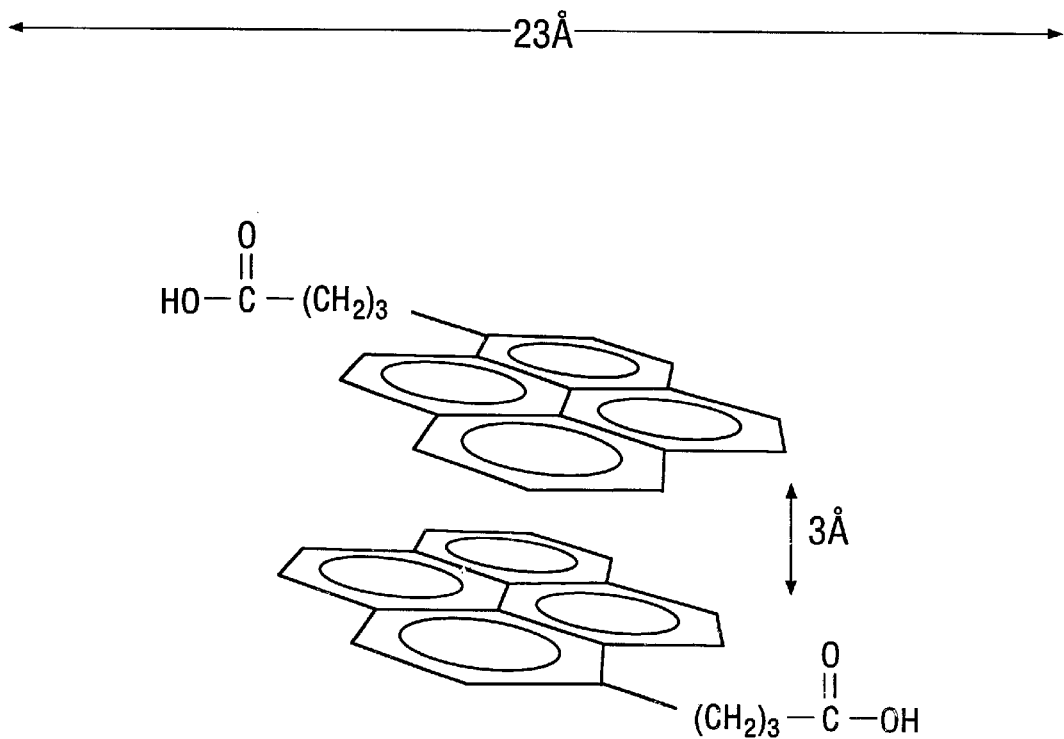
FIG. 12 is a schematic of an excimer of a fluorescent probe molecule, pyrene butyric acid.

A fluorescent probe molecule, pyrene butyric acid, was bound into the amines of the imprinted silicas to determine whether there is a uniform separation between the amines in the void and whether this distance corresponded to the internal distance in the imprint compound. The assay is based on the fact that an isolated pyrene emits at 400 nm while two stacked pyrenes can create an excimer and emit at 470 nm. The structure of the excimer is shown in FIG. 12. The separation between the stacked pyrene moieties is approximately 3 Å and the distance of the excimer is approximately 23 Å (this includes the binding distance to the amines).

Figure 10A:
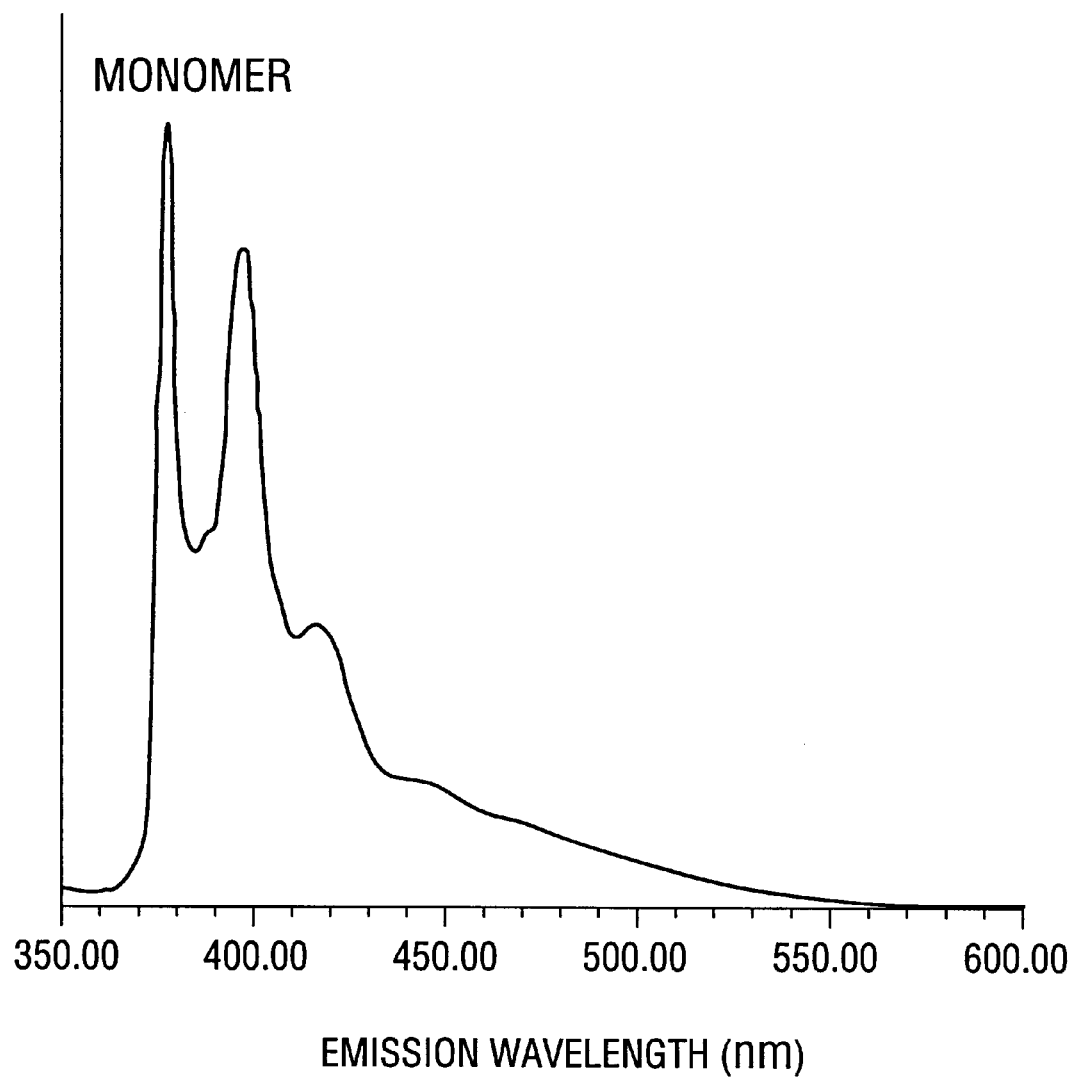
FIG. 10A is the emission spectra for the binding of pyrene butyric acid to the one-point imprinted silica.
Figure 10B:
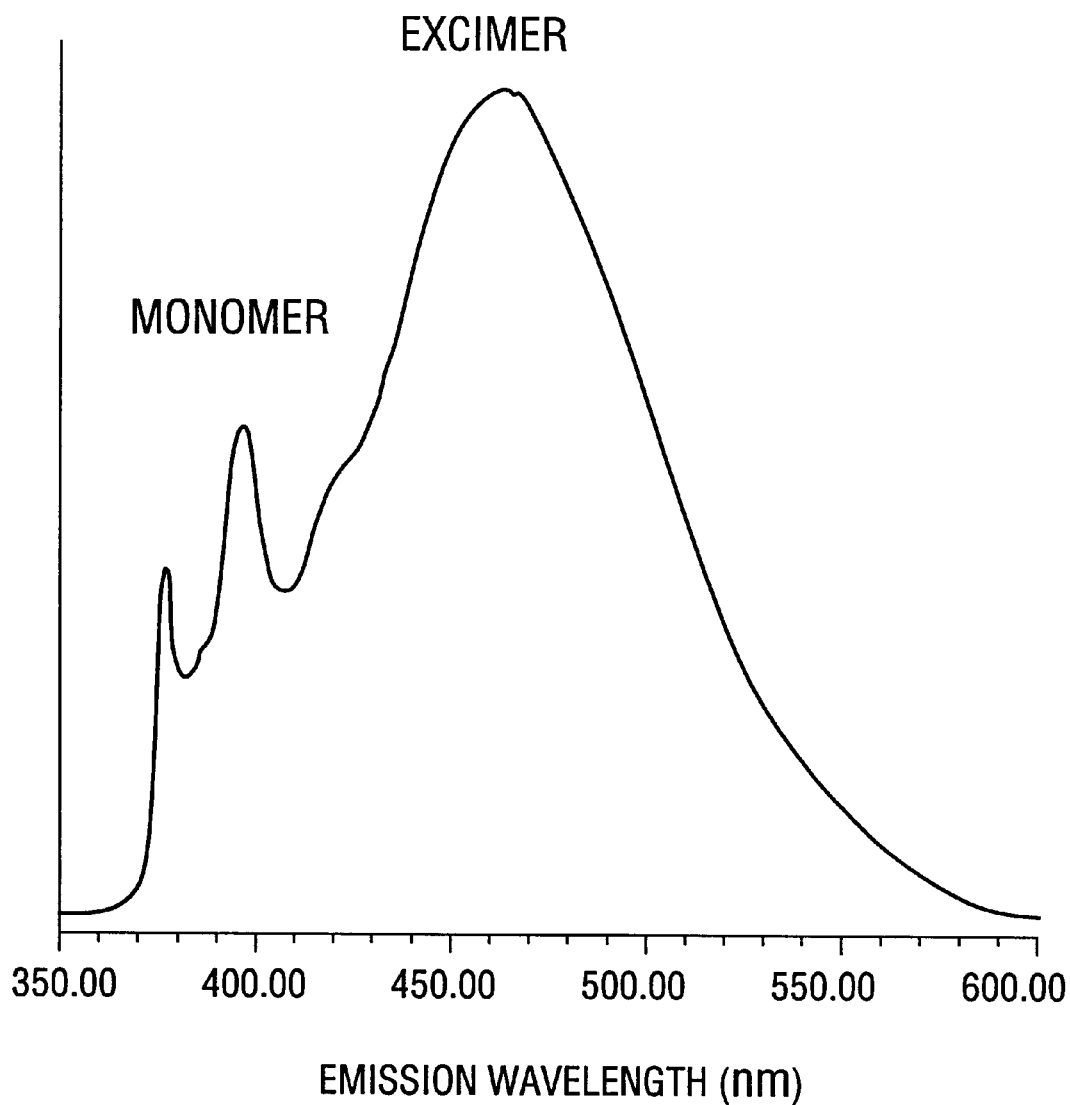
FIG. 10B is the emission spectra for the binding of pyrene butyric acid to surface functionalized amorphous silica (with amine groups).

FIG. 10A is the emission spectra taken at an excitation wavelength of 340 nm for the one point imprinted silica in which approximately 40% of the sites were bound with the pyrene probe molecule. FIG. 10B is the emission spectra taken at an excitation wavelength of 340 nm for amorphous silica which has been surface functionalized with amine groups and in which 4.6% of the sites were bound with the pyrene probe molecule. FIG. 10A indicates that the amines are well isolated suggesting that pores of the one point imprinted silica are each binding one probe molecule. The absence of excimer also suggests that the pores in the one point material are homogeneously distributed. In contrast, FIG. 10B, the corresponding spectra for the surfaced functionalized silica, suggests that the amines are randomly distributed. As expected for a random population, a significant portion of the amines are lumped together. Particularly noteworthy is the large population of the excimer in the surface functionalized silica with a concentration of probe molecule that is 10 fold less than that used for the one point imprinted silica in FIG. 10A.

Figure 11:
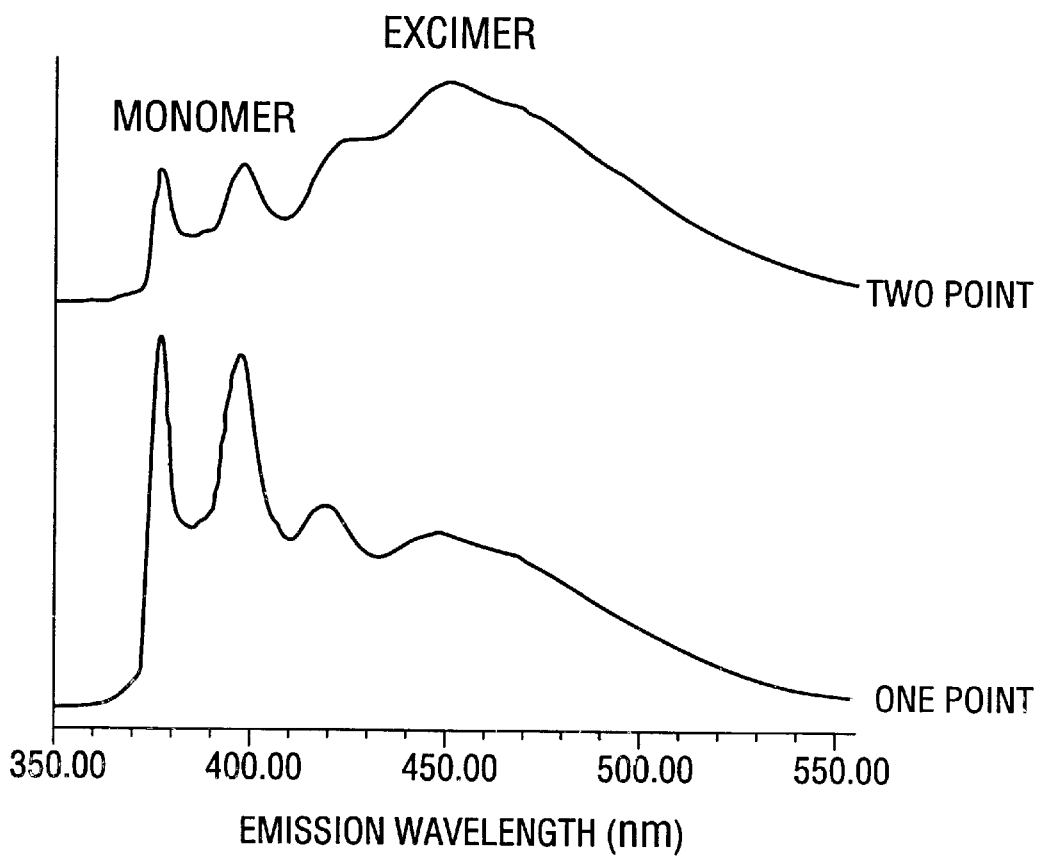
FIG. 11 is an emission spectra taken at an excitation wavelength that selectively excites the excimer over the monomer resonance for the one-point and two-point imprinted silica.

FIG. 11 is a emission spectra taken at an excitation wavelength (292 nm) that selectively excites the excimer over the monomer resonance for the one point and two point imprinted silica in which approximately 42% of the sites were bound with the probe molecule for both cases. As expected, the majority of the probe is bound as the excimer. In other words, these results (taken together with FIG. 10A), show that the amine groups in the one point imprinted silica are separated by a distance greater than the length scale of the pyrene probe molecule (about 23 Å) and that the amine groups in the two point imprinted silica are separated by a distance smaller than the length scale of the pyrene probe. The expected separation between the amine groups in the two point imprint material is 10.9 Å.

Although the present invention has been described with reference to particular embodiments, it should be understood that various features of the embodiments may be used in any suitable combination. Accordingly, although the present invention has been described with reference to preferred embodiments, it should be appreciated that these embodiments are for purposes of illustration only and are not intended to limit the scope of the appended claims.

What is claimed is:

1. An inorganic oxide having micropores, wherein at least a portion of said micropores contains an organic group non-randomly positioned in a first of said micropores such that the position of said organic group relative to said first micropore is substantially similar to the position of an other of said organic group relative to a second micropore of said micropores; and wherein said organic group is covalently attached to the inorganic oxide.

2. The inorganic oxide as in claim 1 wherein the portion of said micropores are homogenously distributed within the inorganic oxide and are substantially similar in size and shape.

3. The inorganic oxide as in claim 1 wherein the organic group is selected from a group consisting of $C_1$–$C_{20}$ alkyl, $C_2$–$C_{20}$ alkenyl, $C_2$–$C_{20}$ alkynyl, cycloalkyl, cycloalkenyl, cycloalkadienyl, aryl, and heteroaryl, each optionally substituted with one or more groups selected from the group consisting of $C_1$–$C_5$ alkyl, $C_2$–$C_5$ alkenyl, $C_2$–$C_5$ alkynyl, allyl, aryl, heteroaryl, and a functional group selected form the group consisting of alcohol, sulfonic acid, phosphine, phosphonate, phosphonic acid, thiol, ketone, aldehyde, ester, ether, amine, quaternary ammonium, imine, amide, imide, imido, nitro, carboxylic acid, disulfide, carbonate, isocyanate, carbodiimide, carboalkoxy, carbamate, acetal, ketal, boronate, cyanohydrin, hydrazone, oxime, oxazole, oxazoline, oxalane, hydrazide, enamine, sulfone, sulfide, sulfenyl, halogen, and metal.

4. The inorganic oxide as in claim 3 wherein the portion of said pores contains organic groups that render said portion with chirality.

5. The inorganic oxide as in claim 3 wherein the organic group is selected from the group consisting of $C_1$–$C_{10}$ alkylamine, $C_2$–$C_{10}$ alkenylamine, $C_2$–$C_{10}$ alkynylamine, cycloalkylamine, and arylamine.

6. The inorganic oxide as in claim 5 wherein the portion of said pores further includes at least one metal-containing ion interacting with the one or more organic groups, the metal-containing ion being selected form the group consisting of $Al^{3+}$, $Ag+$, $Co^{3+}$, $Cu^{2+}$, $Fe^{3+}$, $Hg^{3+}$, $Mn^{3+}$, $Ni^{3+}$, $UO_2^{2+}$, $Zn^{2+}$.

7. The inorganic oxide as in claim 1 wherein at least one organic group forms a coordination complex with a metal or a metal-containing ion.

8. The inorganic oxide as in claim 7 wherein the metal is a transition metal.

9. The inorganic oxide as in claim 7 wherein the organic group is a poryphrin.

10. The inorganic oxide as in claim 7 wherein the coordination complex includes one or more ligands selected from the group consisting of vinyl, allyl, aminoborole, cyclopentadienyl, pentacyclopentadienyl, cyclohexadienyl, phosphine, amine, nitrile, isonitrile, diene, arene, carbonyl, carbene, alkene, alkyne, cyclobutadiene, cycloheptatriene, alkylidene, and halide.

11. The inorganic oxide of claim 1 wherein the inorganic oxide is amorphous silica.

12. An amorphous silica having a framework and discrete micropores, wherein at least a portion of said micropores includes a monomer covalently bonded to the framework, the monomer being non-randomly positioned in a first of said micropores such that the position of said monomer relative to said first micropore is substantially similar to the position of an other of said monomer relative to a second micropore, the monomer having the general formula

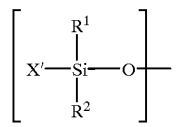

wherein:

X' is a substituted or unsubstituted moiety; and $R^1$ and $R^2$ are independently each oxygen, or substituted or unsubstituted moiety;

the moiety being selected from the group consisting of $C_1$–$C_{20}$ alkyl, $C_2$–$C_{20}$ alkenyl, $C_2$–$C_{20}$ alkynyl, cycloalkyl, cycloalkenyl, cycloalkadienyl, aryl, and heteroaryl, each optionally substituted with one or more groups selected from the group consisting of $C_1$–$C_5$ alkyl, $C_2$–$C_5$ alkenyl, $C_2$–$C_5$ alkynyl, allyl, aryl, heteroaryl, and a functional group.

13. The amorphous silica as in claim 12 wherein the functional group is selected from the group consisting of alcohol, sulfonic acid, phosphine, phosphonate, phosphonic acid, thiol, ketone, aldehyde, ester, ether, amine, quaternary ammonium, imine, amide, imide, imido, nitro, carboxylic acid, disulfide, carbonate, isocyanate, carbodiimide, carboalkoxy, carbamate, acetal, ketal, boronate, cyanohydrin, hydrazone, oxime, oxazole, oxazoline, oxalane, hydrazide, enamine, sulfone, sulfide, sulfenyl, halogen, and metal.

14. The amorphous silica as in claim 13 wherein X' is an organometallic complex including a ligand selected from the group consisting of $C_1$–$C_{20}$ alkyl, aryl, vinyl, allyl, aminoborole, cyclopentadienyl, pentacyclopentadienyl, cyclohexadienyl, phosphine, amine, nitrile, isonitrile, diene, arene, carbonyl, carbene, $C_2$–$C_{20}$ alkene, $C_2$–$C_{20}$ alkyne, cyclobutadiene, cycloheptatriene, and a metal selected from the group consisting of scandium, yttrium, titanium, zirconium, hafnium, chromium, molybdenum, tantalum, tungsten, iron, ruthenium, rhodium, iridium, platinum, and copper.

15. The amorphous silica as in claim 12 wherein the functional group is selected from the group consisting of amine, carboxylic acid, and thiol, and the portion of said voids includes one or more metal-containing ions interacting with said functional group.

16. The amorphous silica as in claim 12 wherein $R^1$ and $R^2$ are both oxygen and X' is selected from the group consisting of $C_1$–$C_{10}$ alkylamine, $C_2$–$C_{10}$ alkenylamine, $C_2$–$C_{10}$ alkynylamine, cycloalkylamine, and arylamine.

17. The amorphous silica as in claim 16 wherein the portion of said micropores further includes at least one metal-containing ion interacting with X', the metal-containing ion selected from the group consisting of $Al^{3+}$, $Ag^+$, $Co^{3+}$, $Cu^{2+}$, $Fe^{3+}$, $Hg^{3+}$, $Mn^{3+}$, $Ni^{3+}$, $UO_{2+}$, and $Zn^{3+}$.

18. The amorphous silica as in claim 12 wherein $R^1$ and $R^2$ are both oxygen and X' is

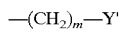

wherein m is from 1 to 6 and Y' is a functional group selected from the group consisting of alcohol, thiol, amine, amide, nitro, carboxylic acid, and halide.

19. The amorphous silica as in claim 18 wherein X' is

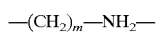

wherein m is from 1 to 6.

20. An amorphous silica having a framework and discrete micropores, wherein at least a portion of said micropores includes a monomer covalently bonded to the framework, the monomer being non-randomly positioned in a first of said micropores such that the position of said monomer relative to said first micropore is substantially similar to the position of an other of said monomer relative to a second micropore, the monomer having the general formula

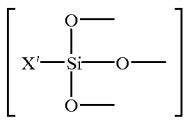

wherein:

X' is selected from the group consisting of $C_1$–$C_{10}$ alkylamine, $C_2$–$C_{10}$ alkenylamine, $C_2$–$C_{10}$ alkynylamine, cycloalkylamine, phenylamine, benzylamine, naphthylamine, cycloalkylamine, phenylamine, benzylamine, naphthylamine, and anthracylamine, each optionally substituted with one or more groups selected from the group consisting of $C_1$–$C_5$ alkyl, $C_2$–$C_5$ alkenyl, $C_2$–$C_5$ alkynyl, allyl, phenyl, and halide.

21. The amorphous silica as in claim 20 wherein the portion of said micropores further includes at least one metal-containing ion interacting with X', the metal containing ion selected from the group consisting of $Al^{3+}$, $Ag^+$, $Co^{3+}$, $Cu^{2+}$, $Fe^{3+}$, $Hg^{3+}$, $Mn^{3+}$, $Ni^{3+}$, $UO_2^{2+}$, and $Zn^{3+}$.

22. The amorphous silica as in claim 20 wherein the portion of said micropores includes at least three monomers covalently bounded to the framework and wherein the at least three monomers each have a different X'.

23. An imprinted silica gel comprising a framework and discrete micropores, the imprinted silica gel formed by copolymerizing a source of silica and an imprint compound of the formula

wherein:

n is any positive integer;

Z is selected from the group consisting of $C_3$–$C_{20}$ branched alkyl, $C_2$–$C_{20}$ alkenyl, cycloalkyl, cycloalkenyl, aryl, and heteroaryl, and, $W^1$ to $W^n$ are each independently any moiety capable of being crosslinked to the silica gel; and wherein Z is covalently attached to $(W^n)_n$; and removing a portion of the imprint compound from the crosslinked material.

24. The imprinted silica gel as in claim 23 wherein n is from 1 to 10, and

Z is selected from the group consisting of isopropyl, isobutyl, tert-butyl, neopentyl, butenyl, isobutenyl, cyclopentane, cyclopentene, cyclopentadiene, cyclohexane, cyclohexene, cyclohexadiene, anthracyl, adamantyl, furyl, imidazolyl, isoquinolyl, phenyl, naphthyl, anthracyl, phenantracyl, pyridyl, pyrimidyl, pyrryl, and quinolyl, each optionally substituted with one or more substituent groups selected from the group consisting of $C_1$–$C_{10}$ alkyl, $C_2$–$C_{10}$ alkenyl, aryl, heteroaryl, and a functional group selected from the group consisting of alcohol, sulfonic acid, phosphine, phosphonate, phosphonic acid, thiol, ketone, aldehyde, ester, ether, amine, quaternary ammonium, imine, amide, imide, imido, nitro, carboxylic acid, disulfide, carbonate, isocyanate, carbodiimide, carboalkoxy, carbamate, acetal, ketal, boronate, cyanohydrin, hydrazone, oxime, oxazole, oxazoline, oxalane, hydrazide, enamine, sulfone, sulfide, sulfenyl, and halogen.

25. The imprinted silica gel as in claim 23 wherein W has the general formula

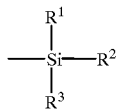

wherein
  $R^1$, $R^2$, and $R^3$ are each independently either a hydrolyzable group or a moiety selected from the group consisting of $C_1$–$C_{20}$ alkyl, $C_2$–$C_{20}$ alkenyl, $C_2$–$C_{20}$ alkynyl, cycloalkyl, cycloalkenyl, cycloalkadienyl, aryl, and heteroaryl, each moiety optionally substituted with one or more substituents selected from the group consisting of $C_1$–$C_5$ alkyl, $C_2$–$C_5$ alkenyl, $C_2$–$C_5$ alkynyl, allyl, aryl, heteroaryl, and a functional group selected from the group consisting of alcohol, sulfonic acid, phosphine, phosphonate, phosphonic acid, thiol, ketone, aldehyde, ester, ether, amine, quaternary ammonium, imine, amide, imide, imido, nitro, carboxylic acid, disulfide, carbonate, isocyanate, carbodiimide, carboalkoxy, carbamate, acetal, ketal, boronate, cyanohydrin, hydrazone, oxime, oxazole, oxazoline, oxalane, hydrazide, enamine, sulfone, sulfide, sulfenyl, and halogen, provided that at least one of $R^1$, $R^2$, and $R^3$ is a hydrolyzable group.

26. The imprinted silica gel as in claim 23 wherein W has the general

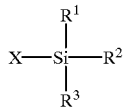

wherein
  $R^1$, $R^2$, and $R^3$ are each independently either a hydrolyzable group or a moiety selected from the group consisting of $C_1$–$C_{20}$ alkyl, $C_2$–$C_{20}$ alkenyl, $C_2$–$C_{20}$ alkynyl, cycloalkyl, cycloalkenyl, cycloalkadienyl, aryl, and heteroaryl, each moiety optionally substituted with one or more substituents selected from the group consisting of $C_1$–$C_5$ alkyl, $C_2$–$C_5$ alkenyl, $C_2$–$C_5$ alkynyl, allyl, aryl, heteroaryl, and a functional group selected from the group consisting of alcohol, sulfonic acid, phosphine, phosphonate, phosphonic acid, thiol, ketone, aldehyde, ester, ether, amine, quaternary ammonium, imine, amide, imide, imido, nitro, carboxylic acid, disulfide, carbonate, isocyanate, carbodiimide, carboalkoxy, carbamate, acetal, ketal, boronate, cyanohydrin, hydrazone, oxime, oxazole, oxazoline, oxalane, hydrazide, enamine, sulfone, sulfide, sulfenyl, and halogen, provided that at least one of $R^1$, $R^2$, and $R^3$ is a hydrolyzable group, and
  X is selected from the group consisting of $C_1$–$C_{20}$ alkyl, $C_2$–$C_{20}$ alkenyl, $C_2$–$C_{20}$ alkynyl, cycloalkyl, cycloalkenyl, cycloalkadienyl, aryl and heteroaryl, each group optionally substituted with one or more substituents selected from the group consisting of $C_1$–$C_5$ alkyl, $C_2$–$C_5$ alkenyl, $C_2$–$C_5$ alkynyl, allyl, aryl, heteroaryl, and a functional group selected from the group consisting of alcohol, sulfonic acid, phosphine, phosphonate, phosphonic acid, thiol, ketone, aldehyde, ester, ether, amine, quaternary ammonium, imine, amide, imide, imido, nitro, carboxylic acid, disulfide, carbonate, isocyanate, carbodiimide, carboalkoxy, carbamate, acetal, ketal, boronate, cyanohydrin, hydrazone, oxime, oxazole, oxazoline, oxalane, hydrazide, enamine, sulfone, sulfide, sulfenyl, and halogen.

27. The imprinted silica gel as in claim 23 wherein W has the general formula

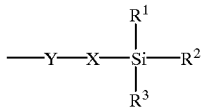

wherein
  $R^1$, $R^2$, and $R^3$ are each independently either a hydrolyzable group or a moiety selected from the group consisting of hydrogen, hydroxy, $C_1$–$C_{20}$ alkyl, $C_2$–$C_{20}$ alkenyl, $C_2$–$C_{20}$ alkynyl, cycloalkyl, cycloalkenyl, cycloalkadienyl, aryl, and heteroaryl, each moiety optionally substituted with one or more substituents selected from the group consisting of $C_1$–$C_5$ alkyl, $C_2$–$C_5$ alkenyl, $C_2$–$C_5$ alkynyl, allyl, aryl, and heteroaryl, provided that at least one of $R^1$, $R^2$, and $R^3$ is a hydrolyzable group;
  X is selected from the group consisting of $C_1$–$C_{20}$ alkyl, $C_2$–$C_{20}$ alkenyl, $C_2$–$C_{20}$ alkynyl, cycloalkyl, cycloalkenyl, cycloalkadienyl, aryl, and heteroaryl; and
  Y is a latent functional group;
the imprint compound including one or more functional groups selected from the group consisting of alcohol, sulfonic acid, phosphine, phosphonate, phosphonic acid, thiol, ketone, aldehyde, ester, ether, amine, quaternary ammonium, imine, amide, imide, imido, nitro, carboxylic acid, disulfide, carbonate, isocyanate, carbodiimide, carboalkoxy, carbamate, acetal, ketal, boronate, cyanohydrin, hydrazone, oxime, oxazole, oxazoline, oxalane, hydrazide, enamine, sulfone, sulfide, sulfenyl, and halogen.

28. The imprinted silica gel as in claim 27 wherein $R^1$, $R^2$, and $R^3$ are the same and are selected from the group consisting of hydrogen, hydroxy, $C_1$–$C_{10}$ alkyloxy, aryloxy, and halide.

29. The imprinted silica gel as in claim 28 wherein
  n is from 1 to 5;
  Z is selected from the group consisting of isopropyl, isobutyl, tert-butyl, neopentyl, butenyl, isobutenyl, cyclopentane, cyclopentene, cyclopentadiene, cyclohexane, cyclohexene, cyclohexadiene, anthracyl, adamantyl, furyl, imidazolyl, isoquinolyl, phenyl, naphthyl, anthracyl, phenantracyl, pyridyl, pyrimidyl, pyrryl, and quinolyl, each optionally substituted with one or more substituent groups selected from the group consisting of $C_1$–$C_{10}$ alkyl, $C_2$–$C_{10}$ alkenyl, aryl, heteroaryl, and a functional group selected from the group consisting of alcohol, sulfonic acid, phosphine, phosphonate, phosphonic acid, thiol, ketone, aldehyde, ester, ether, amine, quaternary ammonium, imine, amide, imide, imido, nitro, carboxylic acid, disulfide, carbonate, isocyanate, carbodiimide, carboalkoxy, carbamate, acetal, ketal, boronate, cyanohydrin, hydrazone, oxime, oxazole, oxazoline, oxalane, hydrazide, enamine, sulfone, sulfide, sulfenyl, and halogen;
  $R^1$, $R^2$, and $R^3$ are the same and selected from the group consisting of methoxy, ethoxy, propoxy, butoxy, and chloride;
  X is selected from the group consisting of $C_1$–$C_{10}$ alkyl, $C_5$–$C_6$ cycloalkyl, $C_5$–$C_6$ cycloalkenyl, phenyl, naphthyl, and anthracyl; and
  Y is selected from the group consisting of amide, carbamate, and ester.

30. The imprinted silica gel as in claim 27 wherein
the source of silica is tetraethylorthosilicate;
Z is phenyl, optionally substituted with one or more $C_1$–$C_{10}$ alkyls;
$R^1$, $R^2$, and $R^3$ are the same and are ethoxy;
X is —$(CH2)_m$ wherein m is from 1 to 6; and,
Y is carbamate.

31. The imprinted silica gel as in claim 26 wherein the imprint compound is selected from the group consisting of naphthyl, anthracyl, phenantracyl, pyridyl, pyrimidyl, pyrryl, and quinolyl, each optionally substituted with one or more substituent groups selected from the group consisting of $C_1$–$C_{10}$ alkyl, $C_2$–$C_{10}$ alkenyl, aryl, and heteroaryl;

$R^1$, $R^2$, and $R^3$ are each independently either a hydrolyzable group or a moiety selected from the group consisting of $C_1$–$C_{20}$ alkyl, $C_2$–$C_{10}$ alkenyl, $C_2$–$C_{20}$ alkynyl, cycloalkyl, cycloalkenyl, cycloalkadienyl, aryl, and heteroaryl, each moiety optionally substituted

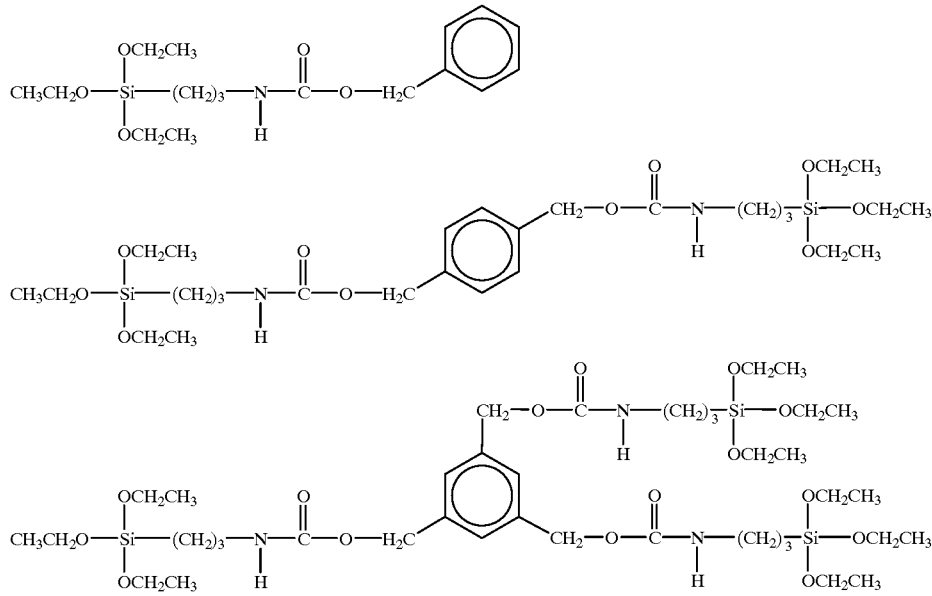

and mixtures thereof.

32. A method of forming a micropore within a crosslinked material, comprising:
copolymerizing a source of inorganic oxide with an imprint compound of the formula $Z$—$W^n)_n$ wherein:
n is any positive integer;
Z is selected from the group consisting of $C_3$–$C_{20}$ branched alkyl, $C_2$–$C_{20}$ alkenyl, cycloalkyl, cycloalkenyl, aryl, and hetero aryl, and,
$W^1$ to $W^n$ are each independently any moiety capable of being crosslinked to the material; and wherein Z is covalently attached to $(W^n)_n$; and
removing a portion of the imprint compound from the crosslinked material.

33. The method as in claim 32 wherein the imprint compound is of the formula

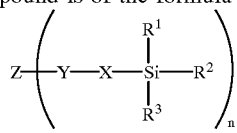

wherein:
n is from 1 to 10;
Z is selected from the group consisting of isopropyl, isobutyl, tert-butyl, neopentyl, butenyl, isobutenyl, cyclopentane, cyclopentene, cyclopentadiene, cyclohexane, cyclohexene, cyclohexadiene, anthracyl, adamantyl, furyl, imidazolyl, isoquinolyl, phenyl, with one or more substituents selected from the group consisting of $C_1$–$C_5$ alkyl, $C_2$–$C_5$ alkenyl, $C_2$–$C_5$ alkynyl, allyl, aryl, and heteroaryl, provided that at least one of $R^1$, $R^2$, and $R^3$ is a hydrolyzable group;

X is selected from the group consisting of $C_1$–$C_{20}$ alkyl, $C_2$–$C_{20}$ alkenyl, $C_2$–$C_{20}$ alkynyl, cycloalkyl, cycloalkenyl, cycloalkadienyl, aryl, and heteroaryl; and Y is selected from the group consisting of amide, carbamate, and ester;

the imprint compound optionally including one or more functional groups selected from the group consisting of alcohol, sulfonic acid, phosphine, phosphonate, phosphonic acid, thiol, ketone, aldehyde, ester, ether, amine, quaternary ammonium, imine, amide, imide, imido, nitro, carboxylic acid, disulfide, carbonate, isocyanate, carbodiimide, carboalkoxy, carbamate, acetal, ketal, boronate, cyanohydrin, hydrazone, oxime, oxazole, oxazoline, oxalane, hydrazide, enamine, sulfone, sulfide, sulfenyl, and halogen.

34. The method as in claim 33 wherein the portion of the imprint compound is removed via a hydrolysis reaction.

35. The method as in claim 32 wherein
the source of silica is tetraethylorthosilicate;
n is from 1 to 5;
Z is aryl, optionally substituted with one or more $C_1$–$C_{10}$ alkyls;
$R^1$, $R^2$, and $R^3$ are the same and are ethoxy;
X is —$(CH_2)_m$ wherein m is from 1 to 6; and,
Y is carbamate.

36. The method as in claim 32 wherein the imprint compound is selected from the group consisting of

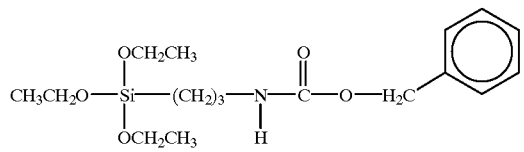

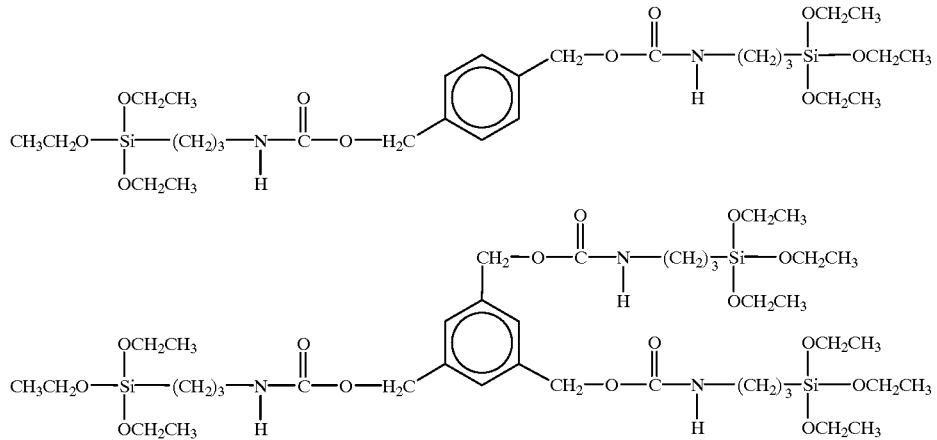

and mixtures thereof.

37. The method as in claim 32 further comprising contacting a source of metal ion with the crosslinked material.

38. The method as in claim 37 wherein the metal ion is selected from the group consisting of $Al^{3+}$, $Ag^+$, $Co^{3+}$, $Cu^{2+}$, $Fe^{3+}$, $Hg^{3+}$, $Mn^{3+}$, $Ni^{3+}$, $UO_2^{2+}$, and $Zn^{3+}$.

39. The method of claim 32 wherein the inorganic oxide is silica.

40. A process for introducing functional groups within a bulk silica, the process comprising:

copolymerizing a source of silica with an imprint compound of the formula $$Z-(W^n)_n$$

wherein:

n is any positive integer;

Z is selected from the group consisting of $C_3$–$C_{20}$ branched alkyl, $C_2$–$C_{20}$ alkenyl, cycloalkyl, cycloalkenyl, aryl, and hetero aryl, and, $W^1$ to $W^n$ are each independently any moiety capable of being crosslinked to the bulk silica; wherein Z is covalently attached to $(W^n)_n$; and removing a portion of the imprint compound from the bulk silica to form a micropore, such that the removal of the imprint compound results in the bulk silica framework being substantially unchanged.

* * * * *